US009143417B2

(12) United States Patent
McReynolds et al.

(10) Patent No.: US 9,143,417 B2
(45) Date of Patent: Sep. 22, 2015

(54) NETWORK COST ANALYSIS

(71) Applicant: LEVEL 3 COMMUNICATIONS, LLC, Broomfield, CO (US)

(72) Inventors: Chris McReynolds, Boulder, CO (US); Joseph Cajetan Lawrence, Boulder, CO (US); Nicolas Pujet, Boulder, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 0 days.

(21) Appl. No.: 14/021,619

(22) Filed: Sep. 9, 2013

(65) Prior Publication Data

US 2014/0010104 A1 Jan. 9, 2014

Related U.S. Application Data

(62) Division of application No. 12/552,983, filed on Sep. 2, 2009, now Pat. No. 8,531,978.

(60) Provisional application No. 61/149,130, filed on Feb. 2, 2009.

(51) Int. Cl.
*H04L 12/26* (2006.01)
*H04L 12/24* (2006.01)

(52) U.S. Cl.
CPC .......... *H04L 43/0876* (2013.01); *H04L 41/142* (2013.01); *H04L 41/147* (2013.01); *H04L 41/12* (2013.01)

(58) Field of Classification Search
CPC ..... H04L 43/0876; H04L 45/02; H04L 41/12; H04L 45/12
USPC .................................. 370/252, 254, 400, 351
See application file for complete search history.

(56) References Cited

U.S. PATENT DOCUMENTS 6,216,117 B1    4/2001 Hall
6,744,727 B2 *  6/2004 Liu et al. .................. 370/228
(Continued)

FOREIGN PATENT DOCUMENTS

EP    1976183 A2    10/2008
JP    2005-311458   11/2005
(Continued)

OTHER PUBLICATIONS

Canadian Examination Report, dated Jan. 24, 2014, Application No. 2,751,211, filed Feb. 1, 2010; 8 pgs.
(Continued)

*Primary Examiner* — Jamal Javaid

(57) ABSTRACT

Embodiments generally disclosed herein include methods and systems for calculating incremental network costs between logical city pairs in a network (each city pair being in communication across the network via one or more physical links). For example, the method includes a cost analyzer that, for each physical link in the network, determines a steady state capacity allocation associated with each city pair in the network and, in the same vein, determines a restoration capacity allocation associated with each city pair in the network. The cost analyzer is capable of calculating an incremental cost per unit of traffic for a given city pair based on: i) the steady state capacity allocation and a restoration capacity allocation associated with a given city pair, as compared to, ii) the aggregate steady state capacity allocations and restoration capacity allocations associated with each city pair in the network.

12 Claims, 17 Drawing Sheets

(56) References Cited

U.S. PATENT DOCUMENTS

| | | |
|---|---|---|
| 7,069,177 B2 | 6/2006 | Carley |
| 2002/0141342 A1* | 10/2002 | Furman et al. ............... 370/235 |
| 2003/0204619 A1 | 10/2003 | Bays |
| 2004/0083277 A1 | 4/2004 | Chaporkar et al. |
| 2004/0179546 A1 | 9/2004 | McDaniel et al. |
| 2005/0063321 A1* | 3/2005 | Imai ............................. 370/256 |
| 2005/0197993 A1 | 9/2005 | Korotky |
| 2005/0201302 A1 | 9/2005 | Gaddis et al. |
| 2005/0232230 A1 | 10/2005 | Nagami et al. |
| 2007/0094062 A1 | 4/2007 | Tracy et al. |
| 2007/0124465 A1 | 5/2007 | Malloy et al. |
| 2008/0062891 A1 | 3/2008 | Van der Merwe et al. |
| 2010/0195516 A1 | 8/2010 | McReynolds et al. |
| 2010/0281388 A1 | 11/2010 | Kane et al. |
| 2015/0039755 A1 | 2/2015 | Kane et al. |

FOREIGN PATENT DOCUMENTS

| | | |
|---|---|---|
| JP | 2007243487 | 9/2007 |
| WO | WO-0223807 A2 | 3/2002 |
| WO | WO-2007148311 A2 | 12/2007 |

OTHER PUBLICATIONS

Extended European Search Report, dated Jul. 28, 2014, Application No. 10736515.7, filed Feb. 1, 2010, 11 pgs.

International Search Report from WIPO, International Application No. PCT/US2010/022768, International Filing Date Feb. 1, 2010, Date of mailing ISR Mar. 30, 2010 , 3 pgs.

International Search Report, dated Apr. 8, 2010, Int'l Appl. No. PCT/US10/022714, Int'l Filing Date Feb. 1, 2010; 3 pgs.

Japanese Examination Report, dated Jan. 22, 2013, Application No. 2011-548376, 2 pgs.

Japanese Examination Report, dated Mar. 19, 2013, Application No. 2011-548367, 4 pgs.

Korean Examination Report, dated Nov. 19, 2012, Application No. 2011-7020385, 6 pgs.

Written Opinion, International Application No. PCT/US2010/022768, International Filing Date Feb. 1, 2010, Date of mailing Written Opinion, Mar. 30, 2010 , 10 pgs.

Canadian Examination Report, dated Sep. 23, 2013, Application No. 2,751,214, filed Feb. 1, 2010; 3 pgs.

Chinese Examination Report, dated Sep. 12, 2013, Application No. 201080015073.8, filed Feb. 1, 2010; 11 pgs.

Chinese Examination Report, dated Nov. 2, 2013, Application No. 201080014371.5, filed Feb. 1, 2010; 9 pgs.

Chinese Examination Report, dated Jun. 27, 2014, Application No. 201080014371.5, filed Feb. 1, 2010; 8 pgs.

Extended European Search Report, dated Mar. 16, 2015, Application No. 10736538.9, filed Feb. 1, 2010; 6 pgs.

Andreozzi, Sergio et al., *Future Generation Computer Systems* vol. 21, No. 4; Elsevier Science Publishers, Amsterdam, NL; XP027777944 Apr. 1, 2005 , pp. 559-571.

* cited by examiner

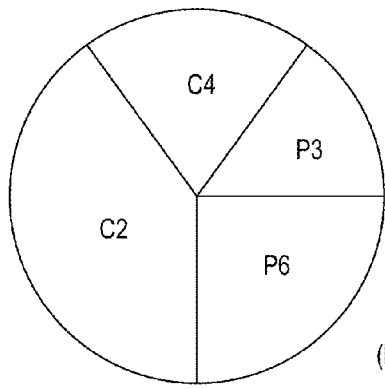
SENT FROM CLIENT 1
REGION 1
REGION PARAMETER
(E.G., US, EUROPE, ETC.)
FIG. 4A
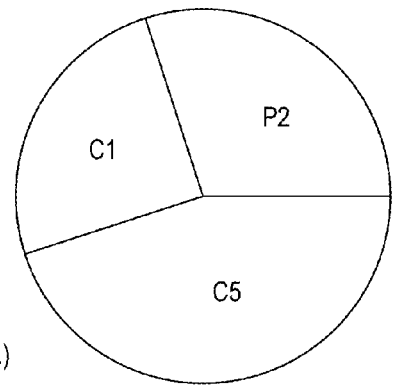
RECEIVED BY CLIENT 1
REGION 2
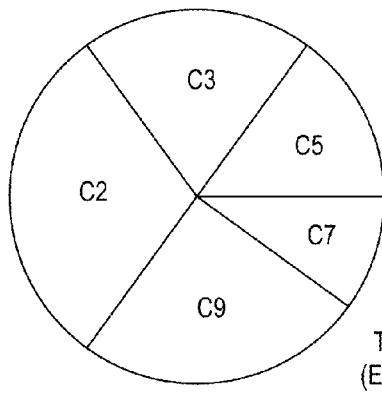
SENT FROM CLIENT 1
ON-NET
TRAFFIC TYPE PARAMETER
(E.G., ON-NET, OFF-NET, ETC.)
FIG. 4B
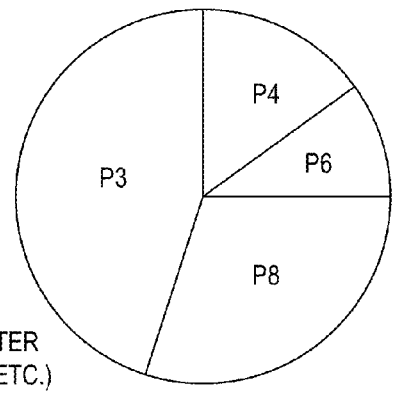
RECEIVED BY CLIENT 1
OFF-NET
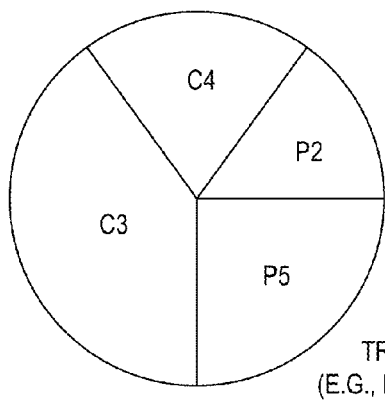
SENT FROM CLIENT 1
BACKBONE
TRANSMISSION PARAMETER
(E.G., BACKBONE, LONG-HAUL, ETC.)
FIG. 4C
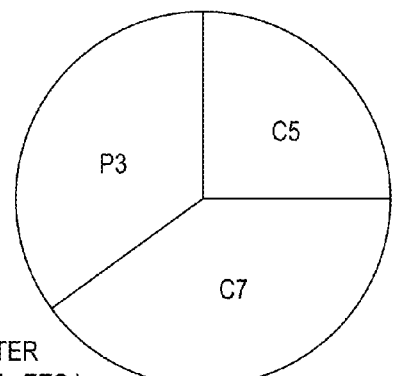
RECEIVED BY CLIENT 1
LONG-HAUL

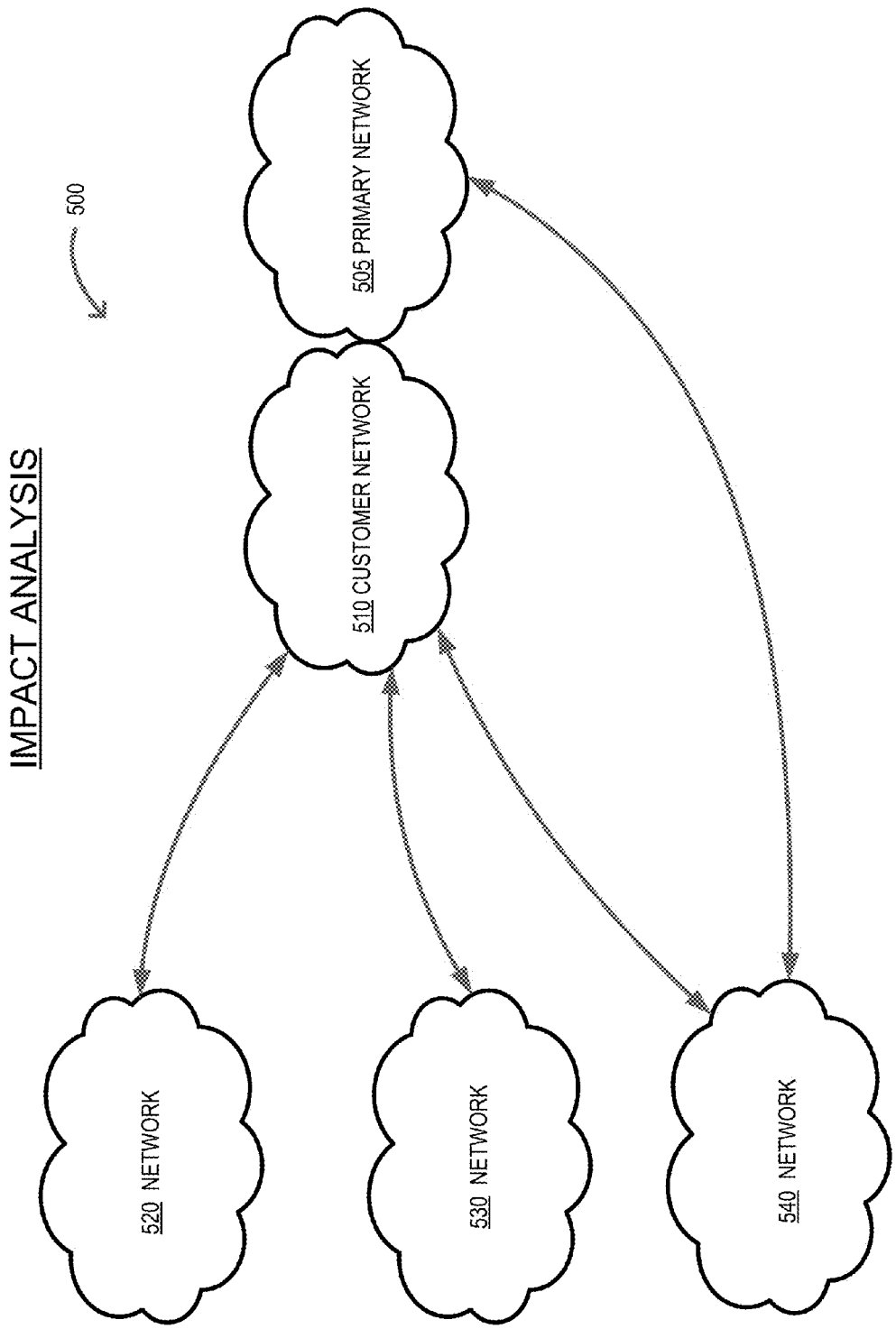

815 LINK FAILURE A BACKUP FLOWS

| LINKS | DAL-DEN | DAL-LAX | DAL-SJC | DEN-LAX | DEN-SJC | SJC-LAX | TOTAL |
|---|---|---|---|---|---|---|---|
| A | 0 | 0 | 0 | 0 | 0 | 0 | 0 |
| B | 1 | 1 | 1 | 0 | 0 | 0 | 3 |
| C | 1 | 0 | 1 | 3 | 0 | 1 | 6 |
| D | 1 | 0 | 0 | 3 | 1 | 0 | 5 |

820 LINK FAILURE B BACKUP FLOWS

| LINKS | DAL-DEN | DAL-LAX | DAL-SJC | DEN-LAX | DEN-SJC | SJC-LAX | TOTAL |
|---|---|---|---|---|---|---|---|
| A | 1 | 1 | 1 | 0 | 0 | 0 | 3 |
| B | 0 | 0 | 0 | 0 | 0 | 0 | 0 |
| C | 0 | 1 | 0 | 3 | 0 | 1 | 5 |
| D | 0 | 1 | 1 | 3 | 1 | 0 | 6 |

825 LINK FAILURE C BACKUP FLOWS

| LINKS | DAL-DEN | DAL-LAX | DAL-SJC | DEN-LAX | DEN-SJC | SJC-LAX | TOTAL |
|---|---|---|---|---|---|---|---|
| A | 1 | 0 | 1 | 1 | 0 | 1 | 4 |
| B | 0 | 1 | 0 | 1 | 0 | 1 | 3 |
| C | 0 | 0 | 0 | 0 | 0 | 0 | 0 |
| D | 0 | 0 | 1 | 0 | 1 | 1 | 3 |

830 LINK FAILURE D BACKUP FLOWS

| LINKS | DAL-DEN | DAL-LAX | DAL-SJC | DEN-LAX | DEN-SJC | SJC-LAX | TOTAL |
|---|---|---|---|---|---|---|---|
| A | 1 | 1 | 0 | 1 | 1 | 0 | 3 |
| B | 0 | 1 | 1 | 1 | 1 | 0 | 4 |
| C | 0 | 0 | 1 | 0 | 1 | 1 | 3 |
| D | 0 | 0 | 0 | 0 | 0 | 0 | 0 |

FIG. 8B

835 TOTAL LINK COSTS

| LINKS | COST/UNIT | STEADY STATE FLOWS | BACKUP FLOWS | TOTAL COST |
|---|---|---|---|---|
| A | 1 | 1 | 3 | 4 |
| B | 1 | 2 | 2 | 4 |
| C | 1 | 5 | 1 | 6 |
| D | 1 | 4 | 2 | 6 |
| TOTAL COSTS: | | 12 | 8 | 20 |

840 STEADY STATE FLOW COST ALLOCATION

| LINKS | DAL-DEN | DAL-LAX | DAL-SJC | DEN-LAX | DEN-SJC | SJC-LAX |
|---|---|---|---|---|---|---|
| A | 9% | 0% | 0% | 0% | 0% | 0% |
| B | 0% | 8% | 8% | 0% | 0% | 0% |
| C | 0% | 0% | 5% | 16% | 0% | 5% |
| D | 0% | 0% | 0% | 17% | 6% | 0% |

FIG. 8C

| LINKS | 845 LINK FAILURE A FLOW COST ALLOCATION | | | | | |
|---|---|---|---|---|---|---|
| | DAL-DEN | DAL-LAX | DAL-SJC | DEN-LAX | DEN-SJC | SJC-LAX |
| A | 0% | 0% | 0% | 0% | 0% | 0% |
| B | 8% | 8% | 8% | 0% | 0% | 0% |
| C | 5% | 0% | 5% | 16% | 0% | 5% |
| D | 6% | 0% | 0% | 17% | 6% | 0% |

| LINKS | 850 LINK FAILURE B FLOW COST ALLOCATION | | | | | |
|---|---|---|---|---|---|---|
| | DAL-DEN | DAL-LAX | DAL-SJC | DEN-LAX | DEN-SJC | SJC-LAX |
| A | 9% | 9% | 9% | 0% | 0% | 0% |
| B | 0% | 0% | 0% | 0% | 0% | 0% |
| C | 0% | 5% | 0% | 16% | 0% | 5% |
| D | 0% | 6% | 6% | 17% | 6% | 0% |

| LINKS | 855 LINK FAILURE C FLOW COST ALLOCATION | | | | | |
|---|---|---|---|---|---|---|
| | DAL-DEN | DAL-LAX | DAL-SJC | DEN-LAX | DEN-SJC | SJC-LAX |
| A | 9% | 0% | 9% | 9% | 0% | 9% |
| B | 0% | 8% | 0% | 8% | 0% | 8% |
| C | 0% | 0% | 0% | 0% | 0% | 0% |
| D | 0% | 0% | 6% | 0% | 6% | 6% |

| LINKS | 860 LINK FAILURE D FLOW COST ALLOCATION | | | | | |
|---|---|---|---|---|---|---|
| | DAL-DEN | DAL-LAX | DAL-SJC | DEN-LAX | DEN-SJC | SJC-LAX |
| A | 9% | 0% | 9% | 9% | 9% | 0% |
| B | 0% | 8% | 8% | 8% | 8% | 0% |
| C | 0% | 0% | 5% | 0% | 5% | 5% |
| D | 0% | 0% | 0% | 0% | 0% | 0% |

FIG. 8D

865 COST ANALYSIS

| LINKS | DAL-DEN | DAL-LAX | DAL-SJC | DEN-LAX | DEN-SJC | SJC-LAX | UTILIZATION |
|---|---|---|---|---|---|---|---|
| A | 1.5 | 0.4 | 0.7 | 0.7 | 0.4 | 0.4 | 0.55 |
| B | 0.3 | 1.3 | 1.0 | 0.7 | 0.3 | 0.3 | 0.60 |
| C | 0.3 | 0.3 | 0.9 | 2.8 | 0.3 | 1.3 | 0.63 |
| D | 0.3 | 0.3 | 0.7 | 3.0 | 1.3 | 0.3 | 0.60 |
| TOTAL | 2.4 | 2.3 | 3.3 | 7.2 | 2.3 | 2.3 | |
| TOTAL/Mbps | 2.4 | 2.3 | 3.3 | 7.2 | 2.3 | 2.3 | |

FIG. 8E

NETWORK COST ANALYSIS

RELATED APPLICATIONS

This application is a divisional of and claims benefit of priority to U.S. Non-Provisional application Ser. No. 12/552,983, filed Sep. 2, 2009, entitled "Network Cost Analysis," which is incorporated by reference in its entirety for all purposes. Application Ser. No. 12/552,983 claims the benefit of U.S. Provisional Application No. 61/149,130, filed Feb. 2, 2009, entitled "Analysis of Network Traffic," which is incorporated by reference in its entirety for all purposes.

TECHNICAL FIELD

Embodiments presently disclosed generally relate to network communications. More specifically, embodiments herein relate to monitoring and correlating network traffic data and analyzing network costs.

BACKGROUND OF THE INVENTION

Networks such as autonomous systems (ASs) are complex systems of devices (e.g., routers, switches, gateways, etc.) and various routing protocols that require constant monitoring and management to ensure efficient performance for its users. Operators of networks often use conventional techniques for monitoring and managing these complex systems. One such conventional technique is made possible by use of the Simple Network Management Protocol (SNMP).

For example, SNMP processes, or agents, run on network devices (e.g., routers, switches, etc.) and monitor network traffic information such as octet strings, network addresses (e.g., Internet Protocol "IP" addresses), object identifiers, and the like. The agent processes periodically report the monitored network traffic information back to one or more central or managing network devices via SNMP. There, the managing network devices can aggregate and process network traffic information from several agent processes that gather and report network data from around the network.

Additionally, there are many costs associated with operating and maintaining a large network. These costs can include, for example, fiber, equipment such as routers and switches, collocation facilities, power, and the like.

SUMMARY OF THE INVENTION

Embodiments generally disclosed herein include methods and systems for monitoring and correlating network traffic data associated with a primary network that is in communication with a plurality of secondary networks. For example, the method includes a network correlator capable of generating a network traffic data set by monitoring network traffic between the primary network and a plurality of secondary networks (e.g., customer and peer networks). The network correlator can further determine a mapping of network connectivity by monitoring inter-network routing information between the primary network and the plurality of secondary networks. In addition, the network correlator can generate a traffic measurement data set by monitoring network utilization statistics between the primary network and plurality of secondary networks.

With this information, the network correlator is capable of calculating a relational network mapping between the primary network and plurality of secondary networks by correlating the network traffic data set, the mapping of network connectivity and the traffic measurement data set. The relational network mapping may be displayed on a graphical user interface in accordance with various configurable parameters.

Embodiments additionally include methods and systems for calculating incremental network costs between logical city pairs in a network (each city pair being in communication across the network via one or more physical links). For example, the method includes a cost analyzer that, for each physical link in the network, determines a steady state capacity allocation associated with each city pair in the network and, in the same vein, determines a restoration capacity allocation associated with each city pair in the network. The cost analyzer is capable of calculating an incremental cost per unit of traffic for a given city pair based on: i) the steady state capacity allocation and a restoration capacity allocation associated with a given city pair, as compared to, ii) the aggregate steady state capacity allocations and restoration capacity allocations associated with each city pair in the network.

An example embodiment includes a system for calculating incremental network costs between node pairs in a network. Such an example system may include a plurality of core routers each being associated with a respective node in the network. The system further includes a traffic flow module capable of generating a traffic demand matrix from sampled traffic measurements acquired from the core routers. In addition, the system comprises a cost analysis module capable of determining a capacity allocation for each link between nodes in the network based on the traffic demand matrix. Furthermore, the cost analysis module may be configured to calculate a cost per unit of traffic transceived between a given node pair based on the capacity allocation for each link in the network.

BRIEF DESCRIPTION OF DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 4A-4C are graphical representations of various relational network mapping configurations in accordance with an example embodiment.

FIG. 5 is a block diagram of a network environment for performing impact analysis in accordance with an example embodiment.

FIGS. 8A-8E are diagrams and tables showing cost analysis calculations in accordance with an example embodiment.

Throughout the drawing figures, like reference numerals will be understood to refer to like parts and components.

DETAILED DESCRIPTION

Embodiments disclosed herein provide for improved methods and systems for monitoring and processing raw network data and creating an analytical framework for evaluating network traffic statistics and behavior. In addition, embodiments further describe methods and systems for analyzing traffic flows and cost allocations in a network. Such improvements will become apparent in the discussion of the embodiments and related figures below.

Figure 1:
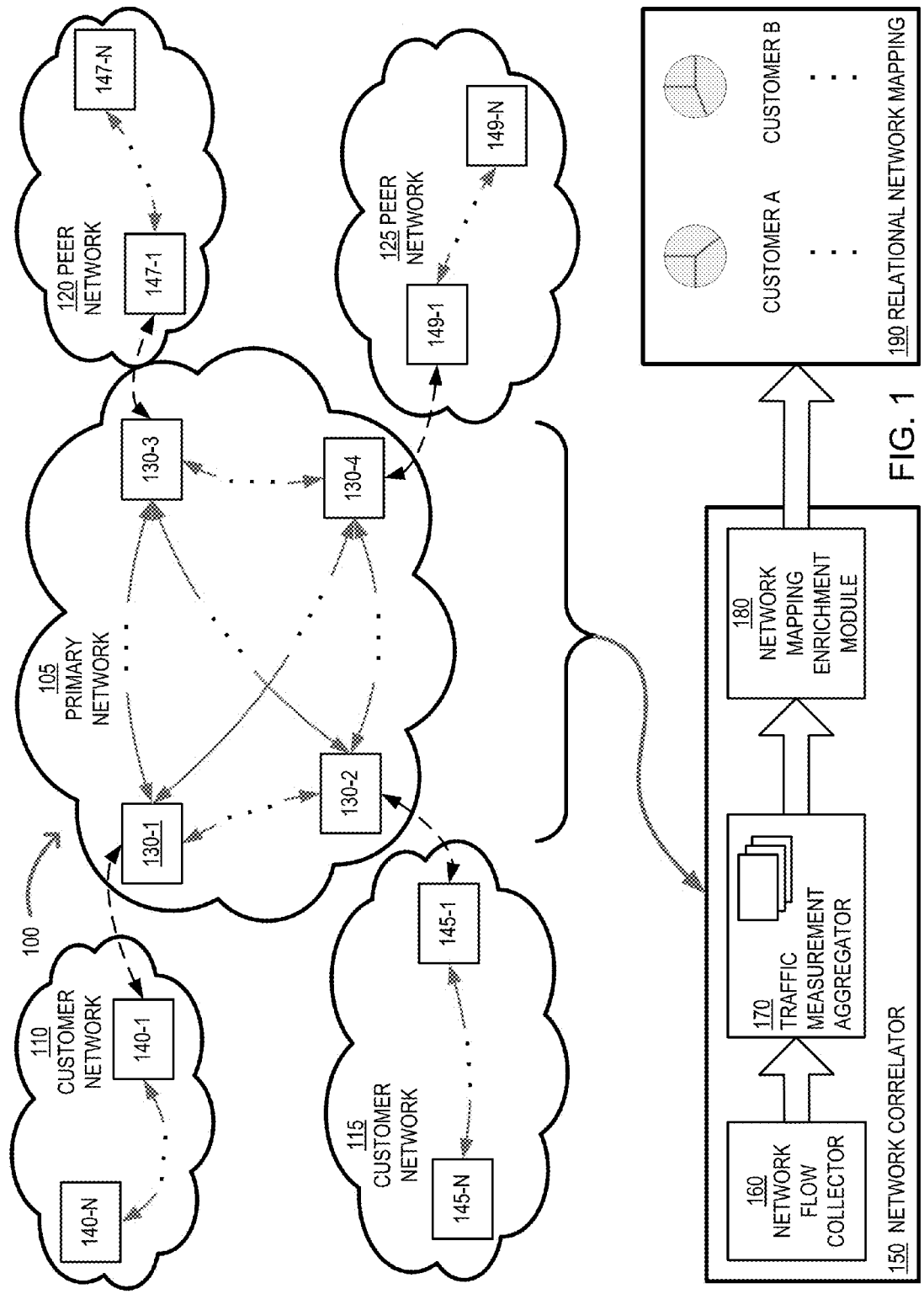
FIG. 1 is a block diagram of a network environment for monitoring and correlating network traffic data in accordance with an example embodiment.

FIG. 1 is a block diagram of a network environment 100 including a primary network 105 and multiple secondary networks. The secondary networks include customer network 110, customer network 115, peer network 120, and peer network 125. Network correlator 150 includes network flow collector module 160, traffic measurement aggregator 170, and network mapping enrichment module 180. Relational network mapping 190 is generated by network correlator 150.

Primary network 105 includes multiple ingress/egress routers in communication with the various secondary networks. For example, edge router 130-1 of primary network 105 interfaces with edge router 140-1 of customer network 110, edge router 130-2 of primary network 105 interfaces with edge router 145-1 of customer network 115, edge router 130-3 of primary network 105 interfaces with edge router 147-1 of peer network 120, and edge router 130-4 of primary network 105 interfaces with edge router 149-1 of peer network 125. Note that edge routers 130-1, 130-2, 130-3, and 130-4 can communicate with one another across primary network 105 over multiple iterations and hops of others routers contained within the primary network as indicated by the ellipses in the double arrowed lines.

Note that edge router 140-1 in customer network 110 can communicate with router 140-N via one or more router hops, wherein router 140-N may interface with another network, gateway, end user, etc. Similarly, edge router 145-1 in customer network 115 can communicate with router 145-N via one or more router hops, wherein router 145-N may interface with another network, gateway, end user, etc. Edge router 147-1 in peer network 120 can communicate with router 147-N via one or more router hops, wherein router 147-N may interface with another network, gateway, end user, etc. Additionally, edge router 149-1 in peer network 125 can communicate with router 149-N via one or more router hops, wherein router 149-N may interface with another network, gateway, end user, etc.

Although only two customer networks and two peer networks are shown in the example embodiment of FIG. 1, more (or fewer) customer and/or peer networks may directly interface with the primary network 105 for purposes of describing the disclosed embodiments.

During general operation, the network correlator 150 monitors and gathers information from the primary network's 105 interaction with the secondary networks. Each module of the network correlator 105 monitors and collects various network data and statistics in order for the network correlator 105 to generate the relational network mapping 190. The relational network mapping 190 can then be represented in a configurable graphical interface for a user (e.g., network operator) to evaluate network behavior and traffic patterns of the primary network 105 with respect to network traffic transceived between (i.e., sent to and received by) the secondary networks. With its robust configurability and integration of rich network data, the relational network mapping 190 can provide valuable insight into previously unrealized business opportunities and network operating strategies. These advantages will become apparent during the discussion of the embodiments and related figures below.

In embodiments disclosed herein, it should be noted that the network correlator 150 (and related modules) can, for example, generate the relational network mapping 190 with network data and statistics supplied only by the primary network 105—although not required for implementation of network correlator 150. In other words, the network correlator 150 need not directly receive or extract network data from other networks (i.e., secondary networks) to generate the relational network mapping 190.

It should also be noted that, although shown as part of the network correlator 105, each module (i.e., network flow collector 160, traffic measurement aggregator 170, and network mapping enrichment module 180) can operate independently of the network correlator 105 as a different process executing on the same or separate devices (e.g., routers, servers, PCs, etc.). The modules in FIG. 1 are shown as part of the network correlator 105 module/process for purposes of example only.

Note that the primary network is designated as "primary" since it is the network being analyzed by the network correlator. Any other network for that matter may also be scrutinized by the network correlator to provide similar statistical and behavioral analysis (e.g., relational network mapping) in accordance with embodiments disclosed herein.

Figure 2:
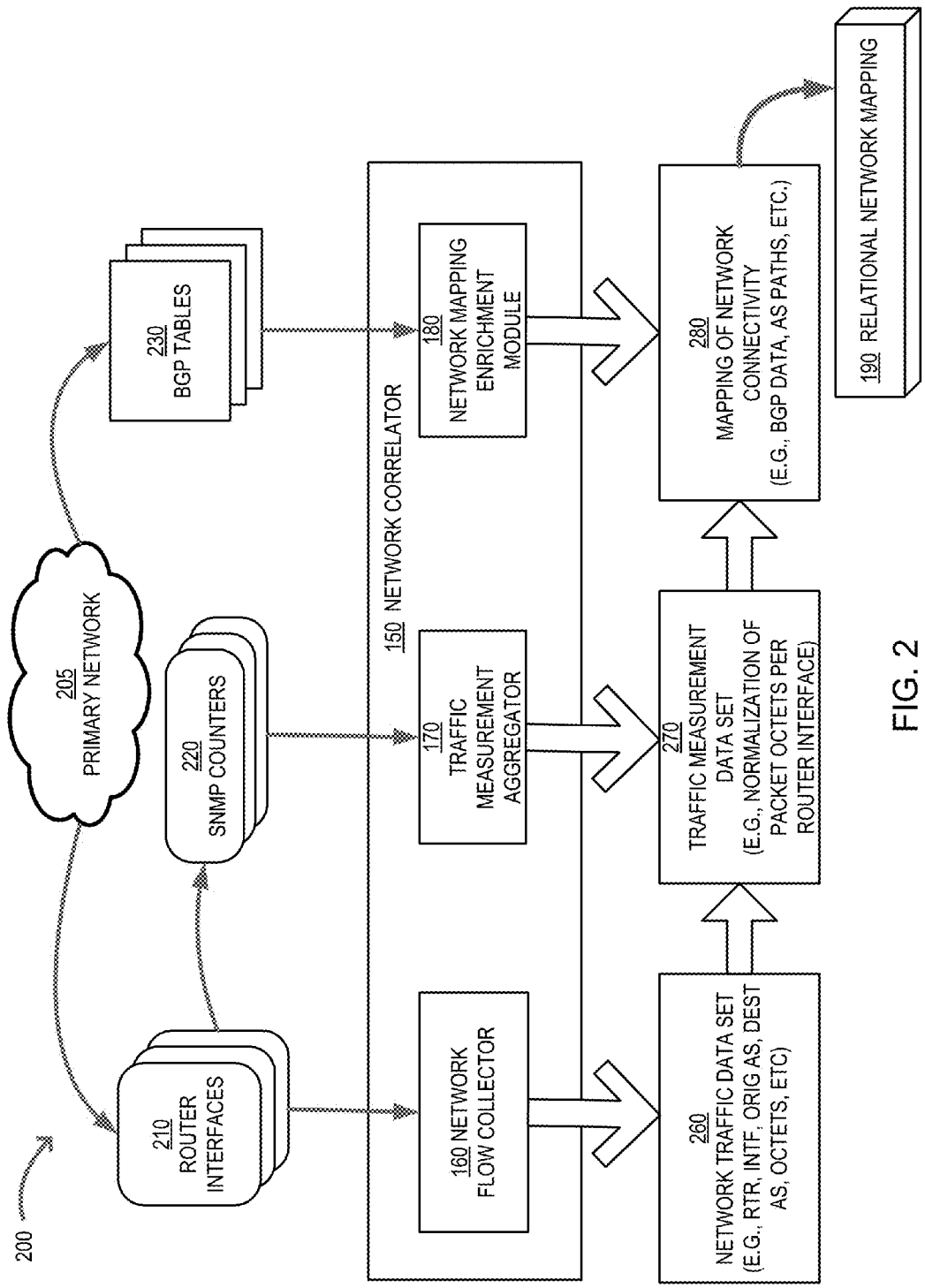
FIG. 2 is a block diagram of a network configuration for monitoring and correlator network traffic data in accordance with an example embodiment.

FIG. 2 is a block diagram of a network processing environment 200 including a primary network 205 and network correlator 250. The primary network supplies information to the network correlator 150 by way of router interfaces 210, Simple Network Management Protocol (SNMP) counters 220, and Border Gateway Protocol (BGP) tables 230. Similar to FIG. 1, network correlator 150 includes network flow collector module 160, traffic measurement aggregator module 170, and network mapping enrichment module 180. The network flow collector module 160 provides a network traffic data set 260, the traffic measurement aggregator module provides a traffic measurement data set 270, and the network mapping enrichment module 180 provides a mapping of network connectivity 280.

During general operation, the network correlator 150 processes and correlates the network traffic data set 260, traffic measurement data set 270, and mapping of network connectivity 280 to generate the relational network mapping 190. Stated differently, the network correlator 150 is said to enrich the network traffic data set 260 with the traffic measurement data set 270 and mapping of network connectivity 280 in order to create the relational network mapping 190, according to an example embodiment.

Generally, the network flow collector module 160 collects network data and statistics to provide information (via network traffic data set 260) related to the identity of who sends and receives network traffic at a particular router interface 210 (e.g., ingress router) in the primary network 205. In particular, this information can include, for example, a router identifier, an interface identifier for that particular router (assuming multiple network interfaces per router), an origin Autonomous System (AS) number, a destination AS number, etc. Such information can also include an estimation or approximation of the amount or rate of traffic transceived at that particular ingress interface.

In the same vein, the traffic measurement aggregator module 170 collects network data and statistics to provide information (via traffic measurement data set 270) related to an amount (or rate) of data transceived at a particular router interface 210 of the primary network 205. This measurement of the amount (or rate) of network traffic made by the traffic measurement aggregator module 170 is much more accurate than the traffic measurement provided by the network flow collector module 160. However, the traffic measurement aggregator module 170 does not know from where the network traffic was received, or to where the network traffic was sent, at the router interface 210. In other words, the traffic measurement aggregator module 170 determines an amount (or rate) of network traffic sent to or received at an ingress router interface 210, but generally does not know who sent or who received this network traffic.

For example, assume that the network flow collector module 160 detects, during a given time period, that a particular router interface 210 receives about 3 megabits per second (Mbps) of network traffic from customer network A that is being transmitted to customer network B. Further assume that the network flow collector module 160 detects that the particular router interface 210 receives about 6 Mbps of network traffic from customer A that is being transmitted to customer C, as well as an additional 9 Mbps of network received that is being transmitted to customer D. In total, the network flow collector module 160 detects approximately 18 Mbps of network traffic received from customer A (and intended for customers B, C and D) at the particular router interface 210 during the given time period. This information is reflected in the network traffic data set 260.

Next, assume that the traffic measurement aggregator 170 detects, for the given time period, that the particular router interface 210 receives a total of 24 Mbps of network traffic from customer A—although not knowing to where the 24 Mbps of network traffic is sent. This information is reflected in the traffic measurement data set 270 (e.g., router interface 210 received network traffic at a rate of 24 Mbps from customer A during a 5 minute sampling interval).

In continuing with the above example, the network correlator 150 would process and correlate the network traffic data set 260 and traffic measurement data set 270 to yield a more accurate (and normalized) representation of network traffic received at the particular router interface 210 during the given time period. As such, the traffic measurement data set 270 normalizes the traffic measurements made by the network flow collector module 160 over the given time period (e.g., 5 minutes) to provide a more precise measurement and assessment of network traffic flow associated with the particular router interface 210. For this example, the network traffic from customer A being sent to customer B would be normalized to 4 Mbps, the network traffic from customer A being sent to for customer C would be normalized to 8 Mbps, and the network traffic from customer A being sent to customer D would be normalized to 12 Mbps—thus yielding a total of 24 Mbps, the same amount/rate of network traffic detected by the traffic measurement aggregator 170 as represented in the traffic measurement data set 270. Note that this is only one example aspect of how the network correlator 150 processes data and does not yet include further enrichment techniques using the mapping of network connectivity 280, as will be discussed further below.

According to another example embodiment, the traffic measurement aggregator 170 monitors and collects network traffic amounts and rates using SNMP counters 220 and SNMP messaging. The SNMP counters 220 typically normalize network traffic data (e.g., packet octets) in accordance with a predetermined sampling rate (e.g., 5 minutes). Normalization can be determined by measuring an amount of data transceived over a router interface 210 during a given sampling period against the associated data rate of network traffic transceived over the router interface 210 during the given sampling period. In one example embodiment, the SNMP counters 220 communicate with the network correlator 150 via SNMP messages/messaging.

Still referring to the example embodiment of FIG. 2, the network mapping enrichment module 180 monitors and collects information from BGP tables associated with the primary network's 205 connectivity relationships with its secondary networks. The BGP tables include, for example, routing tables that are advertised by secondary networks. The routing tables have connectivity information (e.g., IP addresses, AS paths, etc.) that provide which destinations are reachable from a particular ingress router in a secondary network that interfaces with an egress router in the primary network 205. Furthermore, the BGP tables associated with the various secondary networks can be localized into one or more aggregated BGP tables within the primary network, thus providing a more global and complete view of the primary network's connectivity with its secondary networks. In particular, and as will be discussed in more detail below, the mapping of network connectivity 280 provides egress AS numbers associated with network traffic. With egress AS numbers, it can be determined to which secondary network (i.e., directly interfaced network) the traffic is being sent (via an egress router interface of the primary network 205).

As shown in the example embodiment of FIG. 2, the network correlator 150 processes and correlates the network traffic data set 260, the traffic measurement data set 270, and mapping of network connectivity 280 to generate the relational network mapping 190.

The network traffic data set 260, traffic measurement data set 270, and mapping of network connectivity 280 are discussed in more detail below with respect to FIG. 3.

Figure 3:
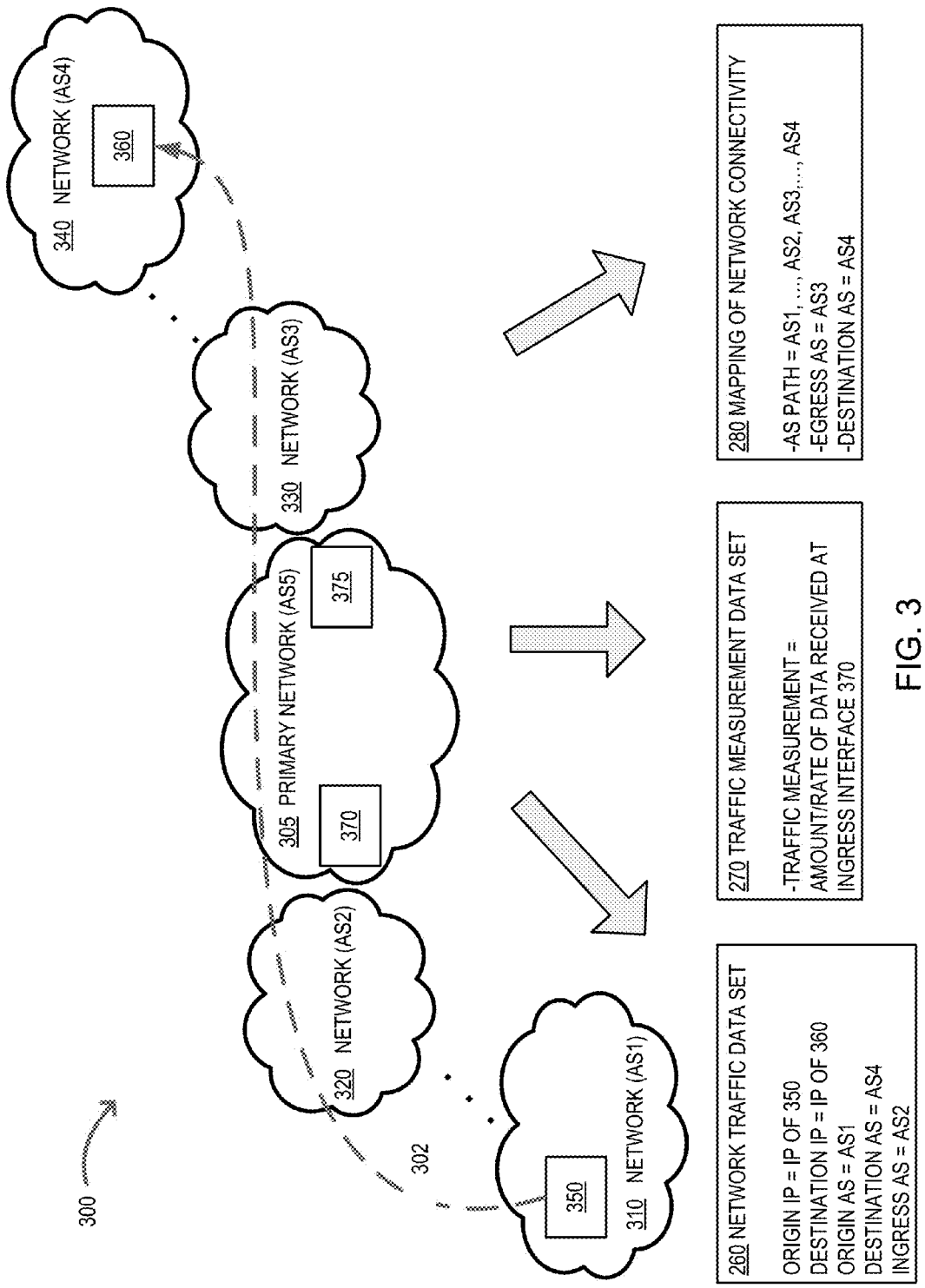
FIG. 3 is a block diagram of a network environment for monitoring and correlating network traffic data in accordance with an example embodiment.

FIG. 3 Is a block diagram of an example network configuration 300 including a primary network 310 having AS number AS5, network 310 having AS number AS1, network 320 having AS number AS2, network 330 having AS number AS3, and network 340 having AS number AS4. Note that the ellipses between network 320 and network 310, and between network 330 and network 340, indicate that one or more networks may reside between those respective networks.

The example embodiment of FIG. 3 depicts router 350 in network 310 sending network traffic (e.g., video stream) to router 360 in network 340 (as indicated by traffic traversal line 302). Note that the network traffic traverses network 320, primary network 305, and network 330 during its journey to destination router 360 in network 340. Further note that the network traffic sent by router 350 passes through ingress router interface 370 and egress router interface 375 of primary network 305.

Given this example data transmission 302, the network flow collector module 160 collects network data and statistics to create network traffic data set 260 having information such as, for example, an origin IP address of router 350, a destination IP address of router 360, an origin AS of network 310

(AS1), a destination AS of network 340 (AS4), an ingress AS of network 320 (AS2), etc. The network traffic data set 260 can also include an approximated amount and/or rate of network traffic associated with the data transmission at the ingress router interface 370.

Furthermore, the traffic measurement aggregator 170 collects network data and statistics to create traffic measurement data set 270. As previously discussed, the traffic measurement aggregator 170 normalizes network traffic amounts and/or rates transceived at a particular ingress interface (e.g., ingress interface 370 in this example) during a given sampling period. The traffic measurement data set 270 can be used to provide a more accurate representation of the amount (or rate) of data transmitted through the primary network 305.

Referring still to FIG. 3, the network mapping enrichment module 180 collects data and statistics to create the mapping of network connectivity 280. For the example data transmission between router 350 and router 360, the mapping of network connectivity 280 can include information such as, for example, AS path (e.g., AS1, . . . , AS2, AS5, AS3, . . . , AS4), egress AS of network 330 (AS3), destination AS of network 340 (AS4), etc. In one example, the egress AS of network 330 (AS3) can be ascertained by determining that network traffic passes through egress router interface 375 of the primary network 305 and, then, using this information to find an associated egress AS in a BGP table that was advertised to egress router interface 375 by network 330.

In another example embodiment, the network correlator 150 (e.g., via network flow collector module 160) can use network data (e.g., router interface identifier, AS number, etc.) to determine the "to whom" and "from whom" of a data transmission. For example, the network correlator (or other process) can perform a table lookup in a customer database using a router interface identifier (or, for example, an IP address, router device identifier, etc.) to determine from which customer network or peer network the transmission is being sent. Similarly, such network data can be used for geo-location purposes to determine a geographic location or proximity of a sender/receiver of the data transmission (e.g., associated with an origination and/or destination IP address). For example, the IP address of the sender/receiver of network traffic can be used to do a table look-up in a database at a third party geo-location server. Such information can be useful to determine more specific geographic spans of a primary network that are utilized during various data transmissions between secondary networks.

FIGS. 4A-4C depict example graphical representations of the relational network mapping 190. In one example embodiment, the network correlator 150 displays these graphical representations in a graphical user interface.

The relational network mapping 190 may be configured according to network parameters in order to show a more detailed perspective of traffic behavior in a primary network. The configurability of such parameters is made possible, at least in part, by the monitoring and correlation of the various network data and statistics provided by the modules disclosed herein.

For example, the relational network mapping 190 may be configured according to a region parameter. The region parameters can narrow the display of the network traffic to various regions supported by the network. Using such data as, for example, origination AS, destination AS, ingress AS, egress AS, etc., the relational network mapping can be selectively configured to only show network traffic transceived over a particular region (e.g., United States, Europe, East Coast, etc.).

FIG. 4A shows two example pie charts that depict a manifestation of the relational network mapping 190 as configured according to the region parameter. The pie chart on the left shows a breakdown of network traffic sent from Customer 1 over Region 1 (e.g., United States) of the primary network during a given time period (e.g., one month). That is, customer C2, customer C4, peer P3, and peer P6 each received a proportion of total network traffic from Customer 1 over Region 1 of the primary network for a given time period as represented by the proportion of each slice of the pie.

Similarly, the pie chart on the right in FIG. 4A shows an example breakdown of network traffic received by Customer 1 over Region 2 (e.g., Europe) of the primary network during a given time period (e.g., one month). That is, customer C1, customer C5, and peer P2 each sent a proportion of total network traffic to Customer 1 over Region 2 of the primary network for a given time period as represented by the proportion of each slice of the pie.

In another example embodiment, the relational network mapping may be configured according to a traffic type parameter. The traffic type parameter can narrow the display of the network traffic to various traffic types supported by the network. Using such data as, for example, an ingress AS, a network interface identifier, etc., the relational network mapping 190 can be selectively configured to show network traffic transceived according to a particular traffic type (e.g., on-net, off-net, etc.). Generally, on-net traffic is traffic sent from or received by a customer network of the primary network. Conversely, off-net traffic is typically network traffic sent from or received by a peer network of the primary network.

FIG. 4B shows two example pie charts that depict a manifestation of the relational network mapping 190 as configured according to the traffic type parameter. The pie chart on the left shows a breakdown of on-net network traffic sent to Customer 1 over the primary network during a given time period (e.g., one week). That is, customer C2, customer C2, customer C5, customer C7, and customer C9 each sent a proportion of total network traffic to Customer 1 over the primary network for a given time period as represented by the proportion of each slice of the pie. Note that since the parameter is configured as "on-net," only customer networks of the primary network are shown in the pie chart, according to this example embodiment.

Similarly, the pie chart on the right in FIG. 4B shows an example breakdown of off-net network traffic received from Customer 1 over the primary network during a given time period (e.g., one week). That is, peer P3, peer P4, peer P6, and peer P8 each sent a proportion of total network traffic to Customer 1 over the primary network for a given time period as represented by the proportion of each slice of the pie. Note that since the parameter is configured as "off-net" in FIG. 4B, only peer networks of the primary network are shown in the pie chart, according to this example embodiment.

According to another example embodiment, the relational network mapping may be configured according to a transmission parameter. The transmission parameter can narrow the display of the network traffic to various transmission types supported by the network. Using such data as, for example, origination AS, destination AS, ingress AS, egress AS, etc., the relational network mapping 190 can be selectively configured to show network traffic transceived according to a transmission type (e.g., backbone, long-haul, etc.).

FIG. 4C shows two example pie charts that depict a manifestation of the relational network mapping 190 as configured according to the transmission parameter. The pie chart on the left shows a breakdown of network traffic sent to Customer 1 over the backbone of the primary network during a given time period (e.g., one month). That is, customer C3, customer C4, peer P2, and peer P5 each sent a proportion of total network traffic to Customer 1 over the backbone of the primary network for a given time period as represented by the proportion of each slice of the pie.

Similarly, the example pie chart on the right in FIG. 4C shows a breakdown of network traffic received from Customer 1 over the long-haul transmission portion of the primary network during a given time period (e.g., one month). That is, customer C5, customer C7, and peer P3 each sent a proportion of total network traffic to Customer 1 over the long-haul transmission portion of the primary network for a given time period as represented by the proportion of each slice of the pie.

Note that each of the parameters (i.e., region, traffic type and transmission) may be configured simultaneously or in various combinations in order to further tailor the representation of the relational network mapping 190. Such robust configurability provides a significant improvement for analyzing network operational statistics in that a network's behavior can be evaluated from varying and unique perspectives at the same time.

For example, the relational network mapping can be configured according to Region 1, On-net traffic, and Backbone traffic for network traffic transceived over the primary network by a particular customer or peer network. Furthermore, the relational network mapping can be configured to show either network traffic received from or sent to a particular customer or peer network over the primary network in addition to one or more configurable combinations of the previously described parameters.

It should also be noted that the parameters (i.e., region, traffic type and transmission) described in these example embodiments do not represent an exhaustive list and, as such, other configurable parameters suitable for representing statistical data of network traffic flow may also be implemented in furtherance of configuring the relational network mapping.

It should be further noted that the pie charts in FIGS. 4A-4C are used for purposes of example only. Certainly, other commonly known methods for representing statistical data (e.g., line graphs, bar graphs, Venn diagrams, etc.) may be used to graphically display the relational network mapping and its various configurations, and such methods and techniques are contemplated to be within the scope of the present embodiments.

Impact Analysis

FIG. 5 is a block diagram of a network environment 500 that depicts an example scenario for performing impact analysis in accordance with embodiments herein. Primary network 505 directly interfaces with customer network 510. Customer network 510, in turn, is in communication with network 520, network 530, and network 540.

In general, impact analysis performed by the network correlator 150 (and manifested by the relational network mapping 190) can be useful to determine the business impact of discontinuing connectivity with a directly interfaced network (e.g., customer network 510 or any other customer or peer network not shown). Referring to the example configuration in FIG. 5, primary network 505 can reach (or is in indirect communication with) network 520, network 530 and network 540 via customer network 510. However, since primary network 505 only has connectivity with network 520 and network 530 via customer network 510, the primary network would lose connectivity to network 520 and network 530 if connectivity with customer network 510 were to be discontinued. Nonetheless, since primary network 505 is already communicably coupled (even if indirectly) with network 540, primary network 505 would not lose connectivity with network 540 if it were to discontinue connectivity with customer network 510.

In one example embodiment, the network correlator 150 (as manifested by the relational network mapping 190) can provide such an impact analysis by determining which AS numbers (and thus which networks) are reachable via customer network 510. The network correlator 150 could then compare these AS numbers with a set of all AS numbers reachable by the primary network 505 that do not connect through customer network 510. Then, those AS numbers that do not overlap in the compared groups of AS numbers would represent networks that are only reachable through customer network 510. In other words, primary network 505 would lose connectivity with those AS numbers that do not overlap (and that are only reachable through customer network 510) if the primary network 505 would discontinue/terminate/etc. connectivity with customer network 510. As a result, business decisions can be encouraged or dissuaded depending on the overall impact of discontinuing connectivity with a particular customer or peer network.

Note that the network correlator 150 can use other techniques and/or parameters for performing an impact analysis and that the embodiment(s) of FIG. 5 have been described for purposes of example only.

Further, and in accordance with the present embodiments, the relational network mapping 190 can be selectively configured to process and display results of an impact analysis on a graphical user interface. For example, the relational network mapping 190 can provide (and display upon a graphical user interface) an impact analysis related to disconnecting a directly interfaced network and any resultant networks (or AS numbers) that would become unreachable by the primary network 505 as a result.

Bypass Detection

Figure 6:
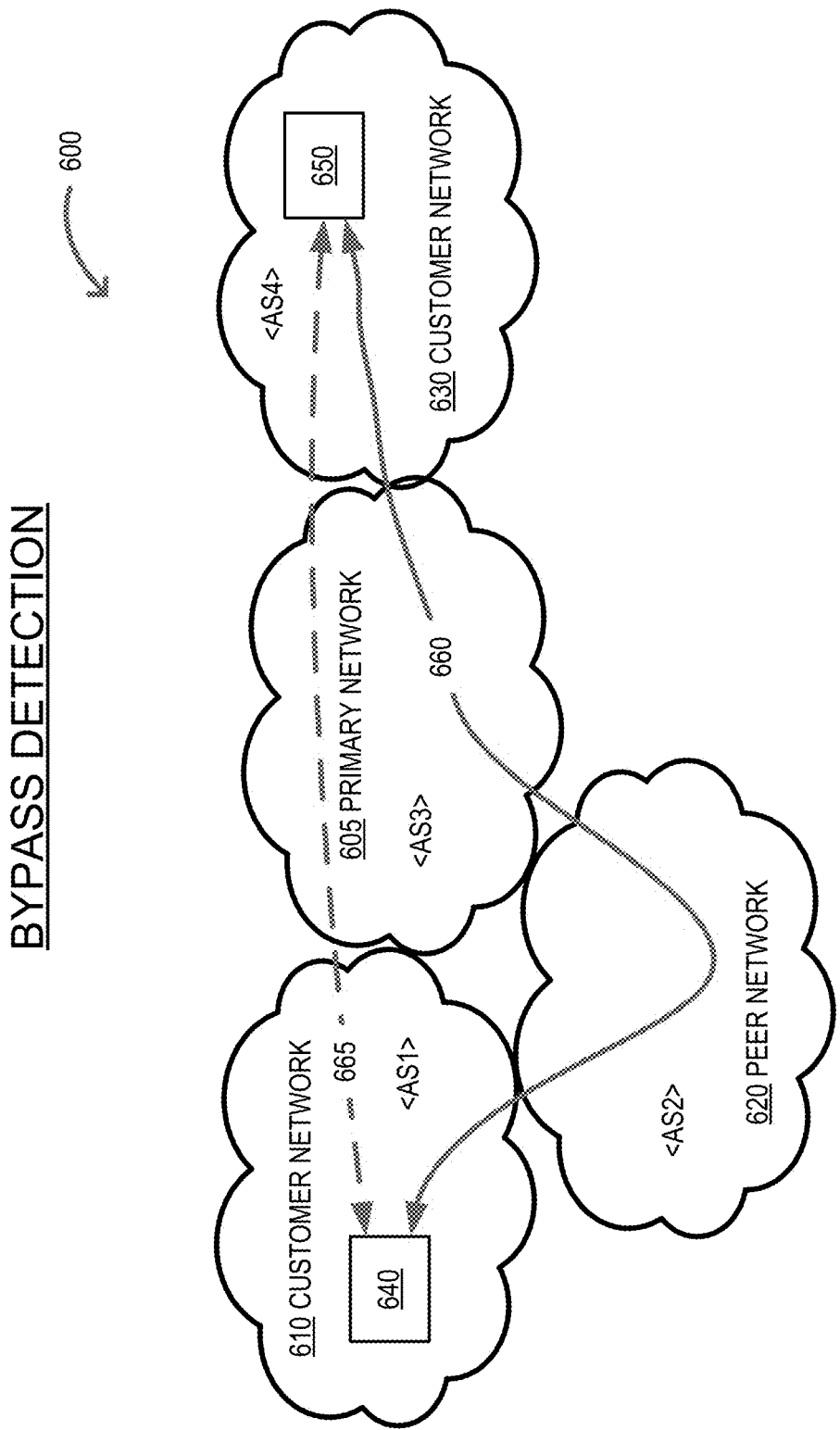
FIG. 6 is a block diagram of a network environment for performing bypass analysis in accordance with an example embodiment.

FIG. 6 is a block diagram of a network environment 600 that depicts an example scenario for performing bypass detection in accordance with embodiments herein. Primary network 605 directly interfaces with customer network 610 (having AS number AS1), peer network 620 (having AS number AS2), and customer network 630 (having AS number AS3). In this example embodiment, router 640 in customer network 610 transceives network traffic with router 650 in customer network 630 (as indicated by traffic traversal line 660). It should be noted that the network traffic does not flow directly from customer network 610 to primary network 605 and, instead, flows indirectly through peer network 620. In other words, peer network 620 is an intermediary network between primary network 605 and customer network 610 (at least for some network traffic, i.e., as indicated by traffic traversal line 660), even though primary network 605 directly interfaces with customer network 610.

In general, bypass detection performed by the network correlator 150 (and manifested by relational network mapping 190) can be useful to determine potential unrealized business opportunities with respect to the operation of the primary network 605. Referring to the example configuration in FIG. 6, since the customer network 610 does not necessarily have to transceive network traffic with the peer network 620 in order to reach customer network 630, proprietors/operators/etc. of the primary network 605 can solicit business (a new or additional connectivity relationship) directly from the customer network 610. This is advantageous for the proprietors/operators/etc. of the primary network 605 since they do not generate any revenue (or negligible revenue) in a traditional peering relationship—such is the case in the example embodiment of FIG. 6 where primary network 605 does not receive any revenue (at least from customer network 610) for transceiving network traffic 660 since primary network 605 interfaces with peer network 620 (instead of customer network 610) for at least the purposes of performing transmission of network traffic 660. Thus, by directly connecting with the customer network 610 with respect to network traffic 660 and, consequently, bypassing connectivity via peer network 620, the primary network 605 is capable of generating additional revenue and realizing previously undetected business opportunities. This direct connectivity relationship is exemplified by traffic traversal line 665 in FIG. 6—note that peer network 620 is no longer a part of the network traffic traversal path 665 between primary network 605 and customer network 610.

According to an example embodiment, the network correlator 150 can use the mapping of network connectivity 280 to compare an origin AS (or destination AS) of a network transmission, such as network traffic 660, with ingress or egress AS numbers already associated with the primary network 605 and its directly interfaced networks. If it determined that the origin AS (or destination AS) of the network transmission is the same as an ingress or egress AS associated with the primary network 605, and that there is one or more AS numbers in the AS path between the origin or destination AS and the primary network, then the network correlator 150 has detected a potential bypass opportunity, i.e., by bypassing the one or more AS numbers in the AS path between the origin or destination AS and the primary network.

Note that the network correlator 150 can use other techniques and/or parameters for performing bypass detection and that the embodiment(s) of FIG. 5 have been described for purposes of example only.

Further, and in accordance with the present embodiments, the relational network mapping 190 can be selectively configured to process and display results of a bypass detection analysis on a graphical user interface. For example, the relational network mapping 190 can provide information related to a directly interfaced customer network that transceives at least some of its network traffic indirectly through another (typically peer) network that is also directly interfaced with the primary network 605. In this example, the graphical display would show the potential customer network and the potential peer network that the primary network 605 could bypass.

Cost Analysis

The costs associated with operating and maintaining a large network can be numerous. The complexity and dynamic nature of these costs has made it difficult to classify and allocate certain costs (and, consequently, pricing to customers) according to the various logical and physical paradigms of a network (e.g., on a city pair basis, on a regional basis, on a per customer basis, etc.). As such, conventional network cost and pricing systems are based on a flat-rate, distance insensitive format. In other words, during typical network operations the cost of transmitting traffic is generally deemed to be the same no matter who sends/receives the traffic, and no matter where the traffic is sent to or received from on the network. Embodiments described herein provide for improved methods and systems for allocating network costs on a more granular level (e.g., a node pair basis).

Figure 7:
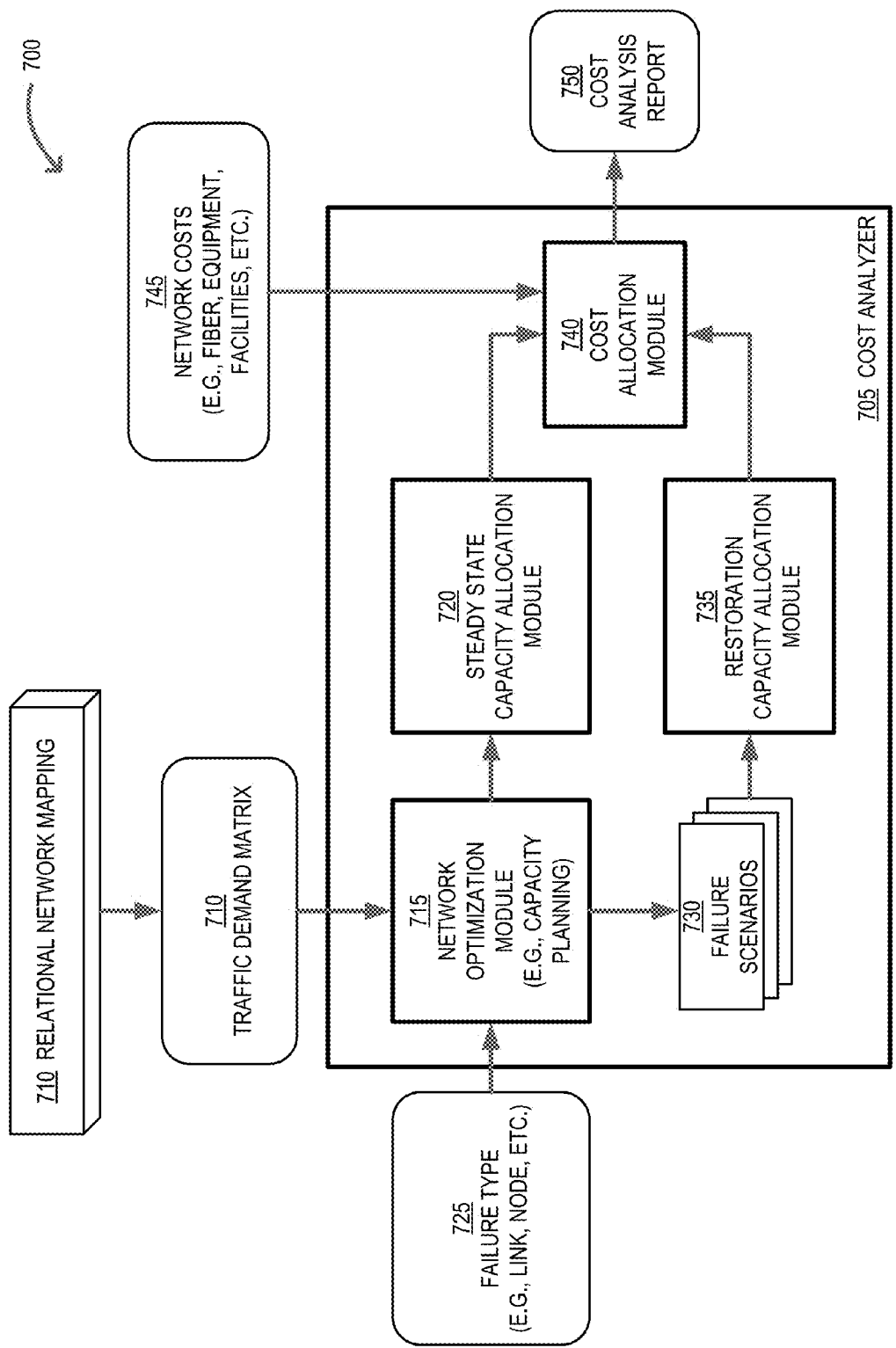
FIG. 7 is a block diagram of a processing environment for analyzing and calculating network costs in accordance with an example embodiment.

FIG. 7 is a block diagram of a processing environment 700 for analyzing and calculating network costs according to node pairs. Processing environment 700 includes cost analyzer 705, relational network mapping 710 (e.g., traffic flow data), traffic demand matrix 710, network optimization module 715, steady state capacity allocation module 720, failure type input 725, failure scenarios 730, restoration capacity allocation module 735, cost allocation module 740, network costs 745, and cost analysis report 750.

During general operation, the relational network mapping 710 provides traffic flow data in the form of a traffic demand matrix 710 to the cost analyzer 705. Although the relational network mapping 710 is used in the context of FIG. 7, any traffic flow input data may be used for implementing this example embodiment (e.g., NetFlow™). The traffic flow data may include, for example, multiple samples of traffic throughput or volume over a given time period between various nodes on a network. The traffic data may then be pared to identify a more accurate account of the amount of traffic transceived over the given time period (e.g., the $95^{th}$ percentile of sampled traffic flows in Mbps taken over a one month time period between two nodes). In this manner, the traffic demand matrix 710 collectively represents the specific traffic flows over a given time period between each node on a network. As previously discussed with respect to FIGS. 1-4, the traffic flows can be further classified and filtered according to customer, region, on-net versus off-net traffic, and the like.

Referring still to the example embodiment of FIG. 7, the network optimization module 715 processes the traffic demand matrix 710 (e.g., traffic flow data or statistics between nodes of a network) in accordance with network capacity techniques and algorithms commonly used in the art (e.g., shortest path routing, link weight optimization, etc.). The network optimization module 715 can tailor its processing according to a specified failure type 725. For example, failure types can include, but are not limited to, link failures (e.g., fiber cuts), node failures (e.g., equipment malfunctions), etc. Each failure type 725 will cause the network optimization module 715 to generate a set of failure scenarios 730 corresponding to the configuration and topology of a network.

In an example embodiment, the network optimization module 715 processes the traffic demand matrix 710 in accordance with a failure type 725 for a single link failure. In this example, the network optimization module 715 determines the impact on network flows between each node on the network for each instance of a link failure on the network. In turn, the network optimization module 715 generates a set of failure scenarios 730 wherein each failure scenario represents a single link failure. In other words, a separate failure scenario is generated for each link in the network. Of course, the network optimization module 715 is also capable of determining the impact on network flows for each instance of two or more link failures (or other similar failure scenario types).

As will be described in further detail below with respect to FIGS. 8A-8E, the network optimization module 715, having processed the traffic demand matrix 715 according to failure type 725, provides both steady state flows and backup (or restoration) flows between each logical node pair in a network. These steady state and backup flows are then used to determine various traffic flow (and, thus, traffic cost) allocations in a network.

Note that logical node pairs are node pairs (e.g., city pairs) that are not necessarily in direct communication via a single (physical) link. In other words, logical node pairs are two network nodes that are connected by one or more links according to network configuration and topology.

Still referring to FIG. 7, steady state capacity allocation module 720 uses data from the network optimization module 715 to determine steady state allocations of traffic flows for each link in the network. The steady state traffic flows and allocations are generally calculated for normal network operating conditions (e.g., in the absence of any failure scenarios).

Example steady state traffic flows and allocations are described below with respect to FIG. 8A and FIG. 8C, respectively.

Restoration capacity allocation module 735 uses data from the network optimization module 715 to determine restoration allocations of traffic flows for each link in the network in accordance with the failure scenarios 730. Restoration (backup) traffic flows and allocations are calculated separately for each failure scenario as provided by the network optimization module 715. For example, in a single link failure scenario, restoration traffic flows and allocations are typically different than the steady state traffic flows and allocations. This is because the network traffic intended for the failed link must be re-routed over other working links in the network (as determined by the network optimization module 715). As such, restoration traffic flows and allocations take into account the added bandwidth that each link may have to accommodate as a result of the inability of the failed link to transceive network traffic. In an example embodiment, the network optimization module 715 determines which links have to be able to accommodate (or allocate) portions of traffic from the failed link for each failure scenario. Example restoration traffic flows and allocations are described below with respect to FIG. 8B and FIG. 8D, respectively.

Cost allocation module 740 uses data from the steady state capacity allocation module 720 and the restoration capacity allocation module 735 to generate the cost analysis report 750 based on a failure type 725. The cost allocation module 740 uses network costs 745 in its analysis to figure in the cost per unit of traffic across the links and nodes of the network (e.g., fiber, equipment, facilities, etc.). According to one example embodiment, the cost analysis report 750 is representative of the relative costs for each logical node pair (e.g., city pair) in the network. An example cost analysis table is described below with respect to FIG. 8E.

It should be noted that by assigning both steady state and restoration traffic flow allocations to each link in the network, network operators and administrators can determine which links and/or node pairs are relatively more or less expensive from an incremental network cost perspective. Thus, network pricing may be based on the relative costs of transceiving traffic over node pairs on the network.

Additionally, a network operator or administrator can enter (e.g., via a graphical user interface) the failure type 725, traffic demand matrix 710, network costs 745, or any other relevant parameters into the cost analyzer 705 for purposes of configuring various failure scenarios and/or cost allocations associated with a network.

FIGS. 8A-8E depict diagrams and tables showing cost analysis calculations in accordance with an example embodiment.

Figure 8A:
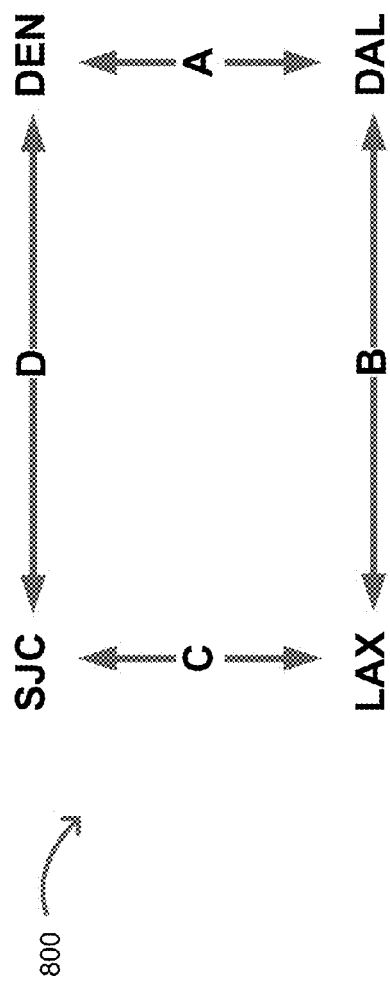

FIG. 8A depicts an example network topology 800, a traffic demand table 805, and steady state traffic flows table 810. The example network topology 800 includes network nodes (i.e., cities associated with a network node) Denver "DEN," Dallas "DAL," Los Angeles "LAX," and San Jose "SJC." Network link A resides between DEN and DAL, link B resides between DAL and LAX, link C resides between LAX and SJC, and link D resides between SJC and DEN. As an example, for network traffic to travel from DEN and LAX it would have to traverse either path A-B or path D-C. The specific routes and paths between node pairs are typically determined by the network optimization module 715.

Traffic demand table 805 shows example traffic demands for each node pair in network topology 800. For purposes of simplicity, the traffic demand for each node pair is assumed to be a unit of 1 (e.g., 1 Mbps per month). As previously discussed, the traffic demand for each link can be provided by the relational network mapping 710 (or any other traffic flow data and statistics repository and/or distribution system).

Steady state traffic flows table 810 shows the steady state traffic flows for each node pair with respect to each link. For example, link C for the DEN-LAX node pair has a steady state traffic flow unit of '3'. This is due to cumulative traffic flows from DEN-LAX via path D-C ('1' demand unit), SJC-LAX via path C ('1' demand unit), and DAL-SJC via path B-C ('1' demand unit)—thus totaling '3' units of traffic flow. However, if traffic for DAL-SJC instead traversed path A-D, then link C for the DEN-LAX node pair would have a steady state traffic flow unit of '2'. As previously mentioned, the steady state traffic flows are based on the routes and paths as determined by the network optimization module 715.

According to table 810, the total steady state traffic flows for each node pair over link A is '1', over link B is '2', over link C is '5', and over link D is '4'. The total steady state traffic flows also represent the capacity that each link should be able to handle (and thus should allocate) during normal network operating conditions.

FIG. 8B shows backup (restoration) traffic flows tables for network topology 800 in accordance with single link failure scenarios. Link failure A backup flows table 815 shows backup traffic flows for each node pair with respect to each link during a failure in link A. Link failure B backup flows table 820 shows backup traffic flows for each node pair with respect to each link during a failure in link B. Link failure C backup flows table 825 shows backup traffic flows for each node pair with respect to each link during a failure in link C. Link failure D backup flows table 830 shows backup traffic flows for each node pair with respect to each link during a failure in link D.

Note that in table 815 the traffic flows for link A are zero for each node pair since link A has failed and cannot transceive network traffic. This measurement is the same in tables 820, 825 and 830 for links B, C and D, respectively. Further note that tables 815, 820, 825 and 830 each show total restoration/backup traffic flows in the far right column for each link after being summed over all node pairs. The total backup traffic flows also represent the capacity that each link should be able to accommodate (and thus should allocate) for each failure scenario.

FIG. 8C shows a total link costs table 835 and a steady state flow cost allocation table 840. Table 835 shows the cost/unit, steady state flows per link, backup (restoration) flows per link, total cost per link, total steady state flows, total backup (restoration) flows, and cumulative total costs in network topology 800. Again, for purposes of simplicity, the cost/unit is assumed to be '1' in this example. Note that the cost/unit can be provided by network costs 745 as previously discussed with respect to FIG. 7.

The steady state flows in table 835 are the total steady state flows from table 810.

The total cost for each link (far right column of table 835) is the cost/unit multiplied by the highest total backup traffic flow number of tables 815, 820, 825 and 830 (or of all the backup traffic flow tables assuming different failure scenarios). For example, the total cost for link D is the cost/unit '1' multiplied by '6', i.e., the highest or maximum of '5' (far right column of table 815), '6' (far right column of table 820), '3' (far right column of table 825) and '0' (far right column of table 825).

The backup flows column in table 835 is the difference between the total cost column (divided by cost/unit) and the steady state column. For example, the backup flows for link D '2' is the total cost ('6' divided by '1' cost/unit) less the steady state flows '4'.

Referring still to FIG. 8C, table 840 shows the steady state flow cost allocation for each node pair over each link. Each entry in the table indicates the relative proportion of total steady state network traffic flow (or capacity) that a given link has for a node pair (e.g., city pair). In one example embodiment, the steady state flow cost allocation for a given link of a given node pair is the steady state traffic flow of the given link for the given node (i.e., the corresponding entry in table 810) divided by the sum of the total traffic flows for the steady state and backup flows of the given link (i.e., total figures for the given link in tables 810, 815, 820, 825 and 830).

For example, the steady state flow cost allocation of link B for node pair DAL-LAX is 8% (per table 840). This can be calculated by dividing the steady state traffic flow of link B for DAL-LAX ('1', per table 810) by the sum of the total traffic flows of link B for the steady sate ('2', per table 810) and backup flows ('3', per table 815; '0', per table 820; '3', per table 825; '4', per table 830). Thus, the calculation for the steady state flow cost allocation of link B for node pair DAL-LAX would be: 1/(2+3+0+3+4)=9%.

According to an example embodiment, the steady state capacity allocation module 720 performs the steady state cost allocation calculations as described with respect to FIG. 8C.

FIG. 8D shows link failure flow cost allocation tables associated with network topology 800. Link failure A flow cost allocation table 845 shows flow cost allocations for each link when link A fails. Link failure B flow cost allocation table 850 shows flow cost allocations for each link when link B fails. Link failure C flow cost allocation table 855 shows flow cost allocations for each link when link C fails. Link failure D flow cost allocation table 860 shows flow cost allocations for each link when link D fails.

Each entry in tables 845, 850, 855 and 860 indicates the relative proportion of total backup network traffic flow (or capacity) that a given link has for a node pair for a given failure scenario. In one example embodiment, the backup (restoration) flow cost allocation of a given link for a given node pair for a given failure scenario is the backup traffic flow of the given link for the given node for the given failure scenario (i.e., the corresponding entry in table 815, 820, 825 or 830) divided by the sum of the total traffic flows for the steady state and backup flows of the given link (i.e., total figures for the given link in tables 810, 815, 820, 825 and 830).

According to one example, the backup flow cost allocation of link C for node pair DEN-LAX for a link B failure scenario is 16% (per table 850). This can be calculated by dividing the backup traffic flow of link C for DEN-LAX for a link B failure ('3', per table 820) by the sum of the total traffic flows of link C for the steady sate ('5', per table 810) and backup flows ('6', per table 815; '5', per table 820; '0', per table 825; '3', per table 830). Thus, the calculation for the backup flow cost allocation of link C for node pair DEN-LAX for a link B failure scenario would be: 3/(5+6+5+0+3)=16%. Indeed, these calculations can then be iterated for each link per node pair per failure scenario.

In another example embodiment, the restoration capacity allocation module 735 performs the backup cost allocation calculations as described with respect to FIG. 8D.

FIG. 8E shows a cost analysis table 865 indicated the total cost per unit of network traffic associated with each node pair of network topology 800. Such information as supplied by table 865 can be used by network operators and administrators to identify relative costs of node pairs (or city pairs) on their networks.

Referencing the example data set of table 865, a cost of a given link for a given node pair can be determined by multiplying the total cost/unit of the given link (far right column of table 835) with the sum of: i) the steady state flow cost allocation of the given link for the given node pair, and ii) the backup flow cost allocations of the given link for the given node pair.

For example, the cost of link D for node pair DEN-LAX is '3.0' per table 865. This can be calculated by multiplying the total cost/unit of link D ('6', per table 835) with the sum of: i) the steady state flow cost allocation of link D for DEN-LAX ('0.17', per table 840), and ii) the backup flow cost allocations of link D for DEN-LAX ('0.17', per table 845; '0.17', per table 850; '0.0', per table 855; '0.0', per table 860). Therefore, the calculation for the cost of link D for node pair DEN-LAX would be: 6×(0.17+0.17+0.17+0+0)=3.0. These calculations can then be iterated for each link per node pair as shown in table 865.

Additionally, the total cost of a given node pair can be determined by adding the cost of each link with respect to the given node pair. For example, in table 865 the total cost of the DAL-SJC node pair is: 0.7+1.0+0.9+0.7=3.3. The total cost/traffic demand can then be determined by dividing the total cost (second to last row in table 865) by corresponding node pair traffic demand figures from table 805. Continuing with the example in this paragraph, the total cost/traffic demand of the DAL-SJC node pair is '3.3' divided by a traffic demand of '1' (table 805)—thus yielding a '3.3' cost per demand for DAL-SJC. Note that in the example network topology 800, the DEN-LAX node pair ('7.2' total cost per traffic demand) is shown to be relatively more costly than, say, node pair DAL-SJC ('3.3' total cost per traffic demand) when it comes to transceiving network traffic across the respective node pairs.

In an example embodiment, the data associated with cost analysis table 865 is generated by cost allocation module 740 as part of the cost analyzer system 705 described with respect to FIG. 7.

It should be noted that the embodiments disclosed with respect to FIGS. 8A-8E are for illustrative purposes while using example network parameters. One of ordinary skill in the art should appreciate that these embodiments are applicable to performing network cost analyses on more complex network configurations and topologies having a variety of different failure scenarios (e.g., node failures).

Figure 9:
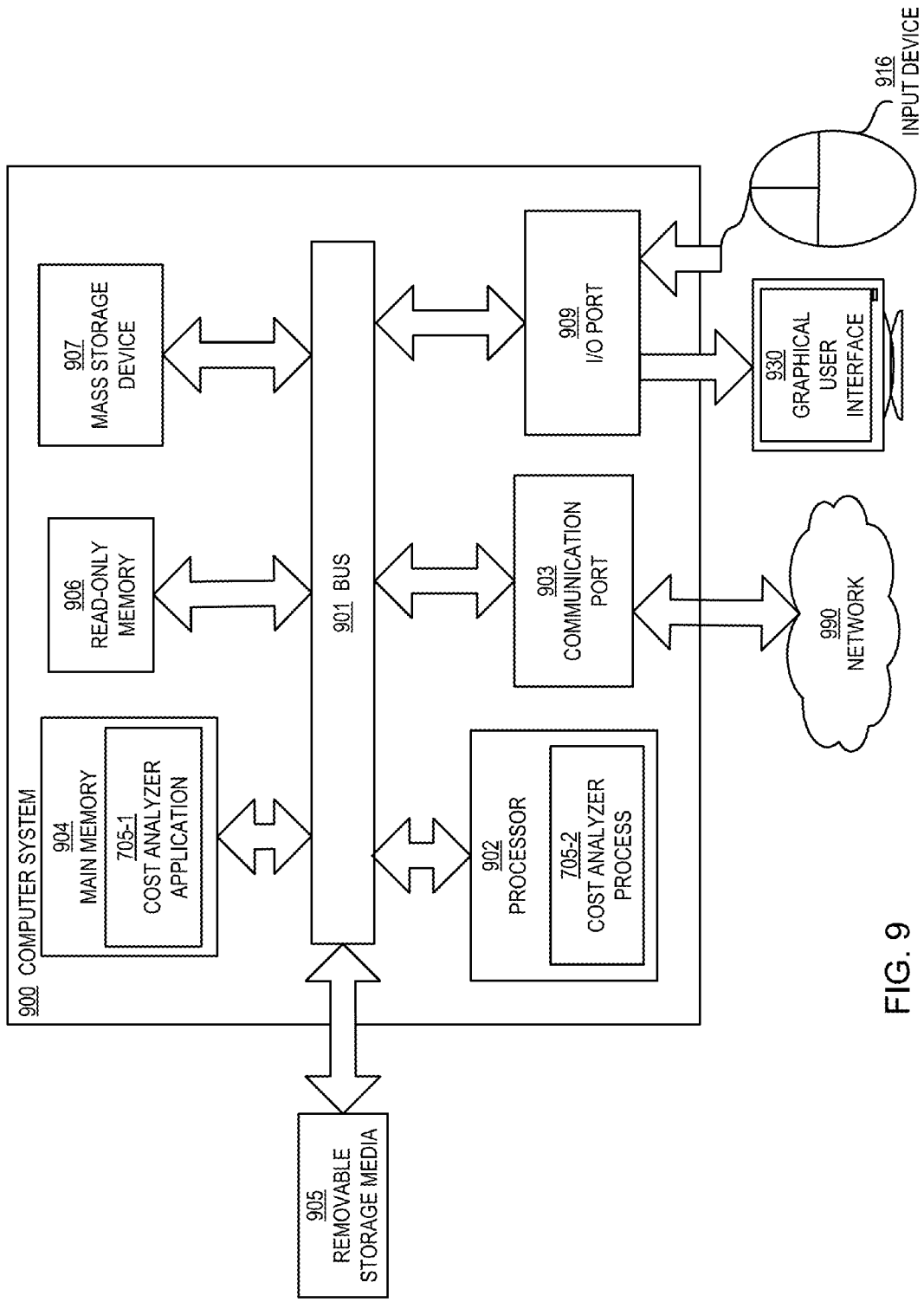
FIG. 9 is a block diagram of a computer system suitable for performing network monitoring and data correlation in accordance with an example embodiment.

FIG. 9 is a schematic diagram of a computer system 900 upon which embodiments of the present invention may be carried out and implemented. For example, one or more computing devices 900 (e.g., servers, routers, gateways, etc.) may be used to manage and analyze incremental network costs on a per-link basis, per-node basis, per-city pair basis, per-customer basis, and/or any combination thereof, or any other metric suitable for evaluating the various costs associated with network operations and administration.

According to the present example, the computer system 900 includes a bus 901 (i.e., interconnect), at least one processor 902, at least one communications port 903, a main memory 904, a removable storage media 905, a read-only memory 906, and a mass storage 907. Processor(s) 902 can be any known processor, such as, but not limited to, an Intel® Itanium® or Itanium 2® processor(s), AMD® Opteron® or Athlon MP® processor(s), or Motorola® lines of processors. Communications ports 903 can be any of an RS-232 port for use with a modem based dial-up connection, a 10/100 Ethernet port, a Gigabit port using copper or fiber, a USB port, and the like. Communications port(s) 903 may be chosen depending on a network such as a Local Area Network (LAN), a Wide Area Network (WAN), or any network to which the computer system 900 connects (e.g., network 990). The computer system 900 may be in communication with peripheral devices (e.g., display screen and/or graphical user interface 930, input device 916) via Input/Output (I/O) port 909.

Main memory 904 can be Random Access Memory (RAM), or any other dynamic storage device(s) commonly known in the art. Read-only memory 906 can be any static storage device(s) such as Programmable Read-Only Memory (PROM) chips for storing static information such as instructions for processor 902. Mass storage 907 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 901 communicatively couples processor(s) 902 with the other memory, storage and communications blocks. Bus 901 can be a PCI/PCI-X, SCSI, or Universal Serial Bus (USB) based system bus (or other) depending on the storage devices used. Removable storage media 905 can be any kind of external hard-drives, floppy drives, Compact Disc-Read Only Memory (CD-ROM), Compact Disc—Re-Writable (CD-RW), Digital Video Disk—Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 904 is encoded with cost analyzer application 705-1 that supports functionality as discussed above and as discussed further below. Cost analyzer application 705-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 902 accesses main memory 904 via the use of bus 901 in order to launch, run, execute, interpret or otherwise perform the logic instructions of the cost analyzer application 705-1. Execution of net cost analyzer application 705-1 produces processing functionality in cost analyzer process 705-2. In other words, the cost analyzer process 705-2 represents one or more portions of the cost analyzer application 705-1 performing within or upon the processor(s) 902 in the computer system 900.

It should be noted that, in addition to the cost analyzer process 705-2 that carries out method operations as discussed herein, other embodiments herein include the cost analyzer application 705-1 itself (i.e., the un-executed or non-performing logic instructions and/or data). The cost analyzer application 705-1 may be stored on a computer readable medium (e.g., a repository) such as a floppy disk, hard disk or in an optical medium. According to other embodiments, the cost analyzer application 705-1 can also be stored in a memory type system such as in firmware, read only memory (ROM), or, as in this example, as executable code within the main memory 9104 (e.g., within Random Access Memory or RAM). For example, cost analyzer application 705-1 may also be stored in removable storage media 905, read-only memory 906, and/or mass storage device 907.

In addition to these embodiments, it should also be noted that other embodiments herein include the execution of the cost analyzer application 705-1 in processor(s) 902 as the cost analyzer process 705-2. Thus, those skilled in the art will understand that the computer system 900 can include other processes and/or software and hardware components, such as an operating system that controls allocation and use of hardware resources, or such as instances of the network correlator 150, the network flow collector module 160, the traffic measurement aggregator 170 and/or the network mapping enrichment module 180. As such, the cost analyzer 705 (application 705-1 and process 705-2), network correlator 150 (application 150-1 and process 150-2), network flow collector module 160 (application 160-1 and process 160-2), traffic measurement aggregator 170 (application 170-1 and process 170-2), and network mapping enrichment module 180 (application 180-1 and process 180-2) may be implemented on the same computerized device 900 (e.g., router, server, etc.) as the same or separately executed processes, or on separate devices in various combinations as the same or separately executed processes.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

FIGS. 10-13 include flowcharts according to embodiments herein. The rectangular elements are herein denoted as "steps" and represent computer software instructions or groups of instructions that carry out such functions. The flow diagrams do not necessarily depict the syntax of any particular programming language. Rather, the flow diagrams illustrate the functional information one of ordinary skill in the art could use to fabricate circuits or to generate computer software (or a hybrid of both circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 10:
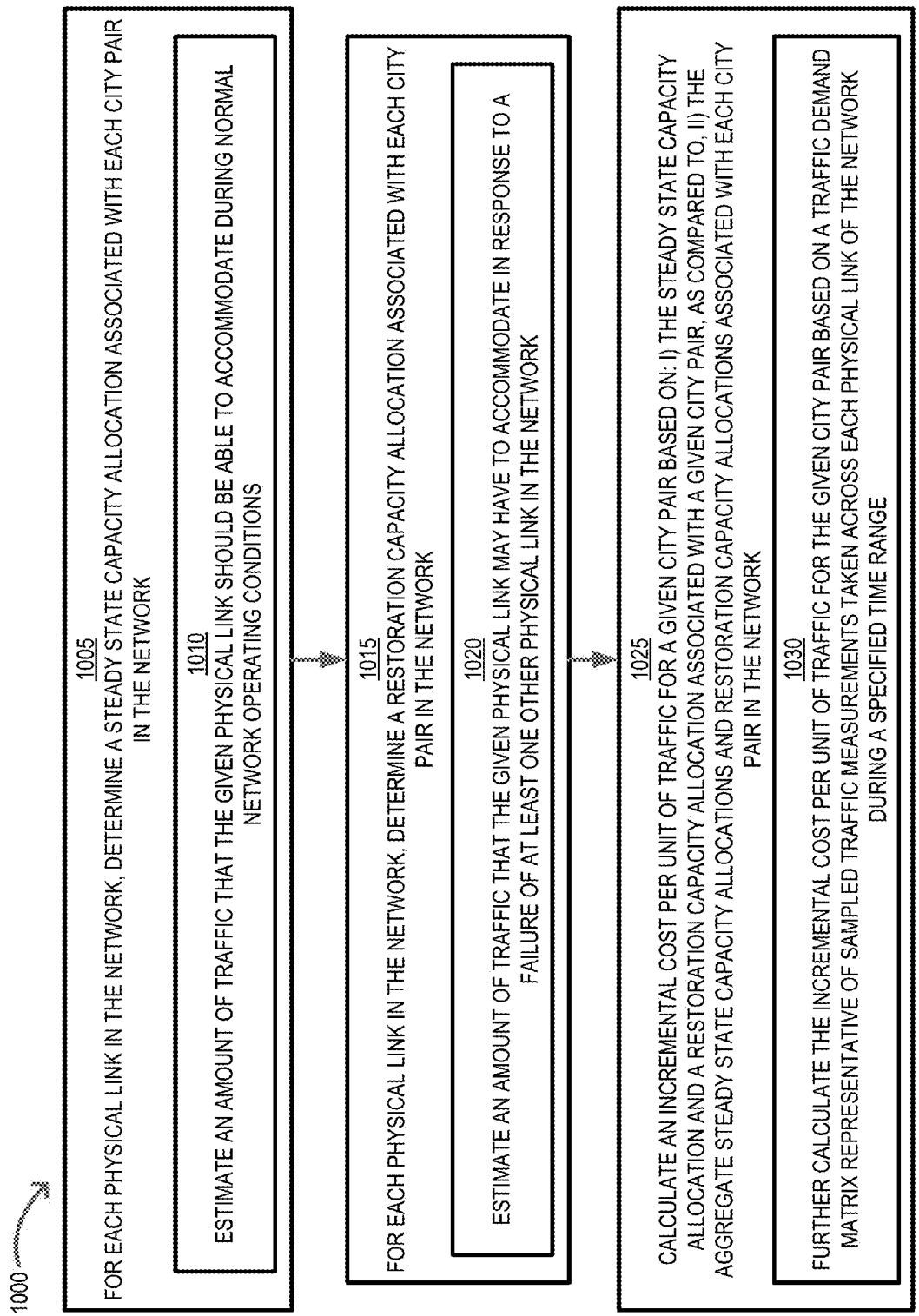
FIG. 10 is a flow chart that shows processing operations performed by a network correlator in accordance with an example embodiment.

Now, more specifically, FIG. 10 is a flow chart 1000 of processing steps that shows processing operations performed by the cost analyzer 705 (i.e., cost analyzer application 705-1 and/or the run-time implementation of cost analyzer process 705-2) in accordance with one example embodiment.

In step 1005, for each physical link in the network, the cost analyzer 705 determines a steady state capacity allocation associated with each node pair (e.g., city pair) in the network.

In step 1010, the cost analyzer 705 estimates an amount of traffic that the given physical link should be able to accommodate during normal or typical network operating conditions.

In step 1015, for each physical link in the network, the cost analyzer 705 determines a restoration capacity allocation associated with each node pair (e.g., city pair) in the network.

In step 1020, the cost analyzer 705 estimates an amount of traffic that the given physical link may have to accommodate in response to a failure of at least one other physical link in the network.

In step 1025, the cost analyzer 705 calculates an incremental cost per unit of traffic for a given node pair (e.g., city pair) based on: i) the steady state capacity allocation and a restoration capacity allocation associated with a given node pair, as compared to, ii) the aggregate steady state capacity allocations and restoration capacity allocations associated with each node pair in the network.

In step 1030, the cost analyzer 705 further calculates the incremental cost per unit of traffic for a given node pair (e.g., city pair) based on a traffic demand matrix representative of sampled traffic measurements taken across each physical link of the network during a specified time range (e.g., $95^{th}$ percentile of sampled traffic volume over a month). In another example embodiment, the steady state capacity allocations and the restoration capacity allocations are determined, at least in part, by a network capacity planning algorithm (e.g., network optimization, traffic engineering, shortest path routing, link weight optimization, etc.). For example, a traffic flow module can be configured to generate the traffic demand matrix based on the sampled traffic measurements.

Figure 11:
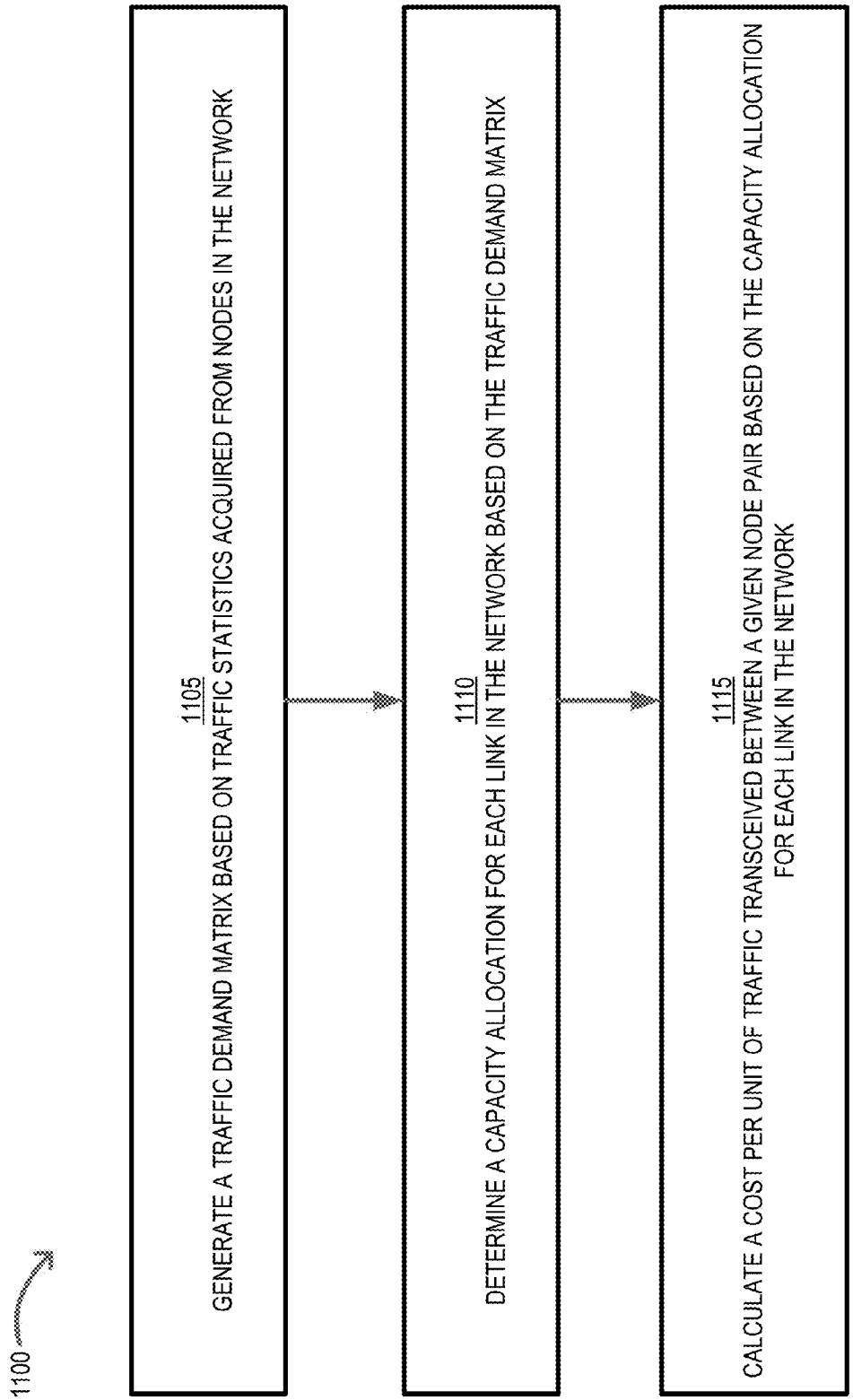
FIG. 11 is a flow chart that shows processing operations performed by a network correlator in accordance with an example embodiment.

FIG. 11 is a flow chart 1100 of processing steps that shows processing operations performed by the cost analyzer 705 in accordance with one example embodiment.

In step 1105, the cost analyzer 705 generates a traffic demand matrix based on traffic statistics acquired from nodes in the network. For example, the statistics may be supplied from the relational network mapping 710 as previously described.

In step 1110, the cost analyzer 705 determines a capacity allocation for each link in the network based on the traffic demand matrix. For example, the capacity allocation may take into account steady state and/or backup (restoration) traffic flows over each link for each node pair and in light of various failure scenarios (e.g., link failures, node failures, etc.).

In step 1115, the cost analyzer 705 calculates a cost per unit of traffic transceived between a given node pair based on the capacity allocation for each link in the network.

Figure 12:
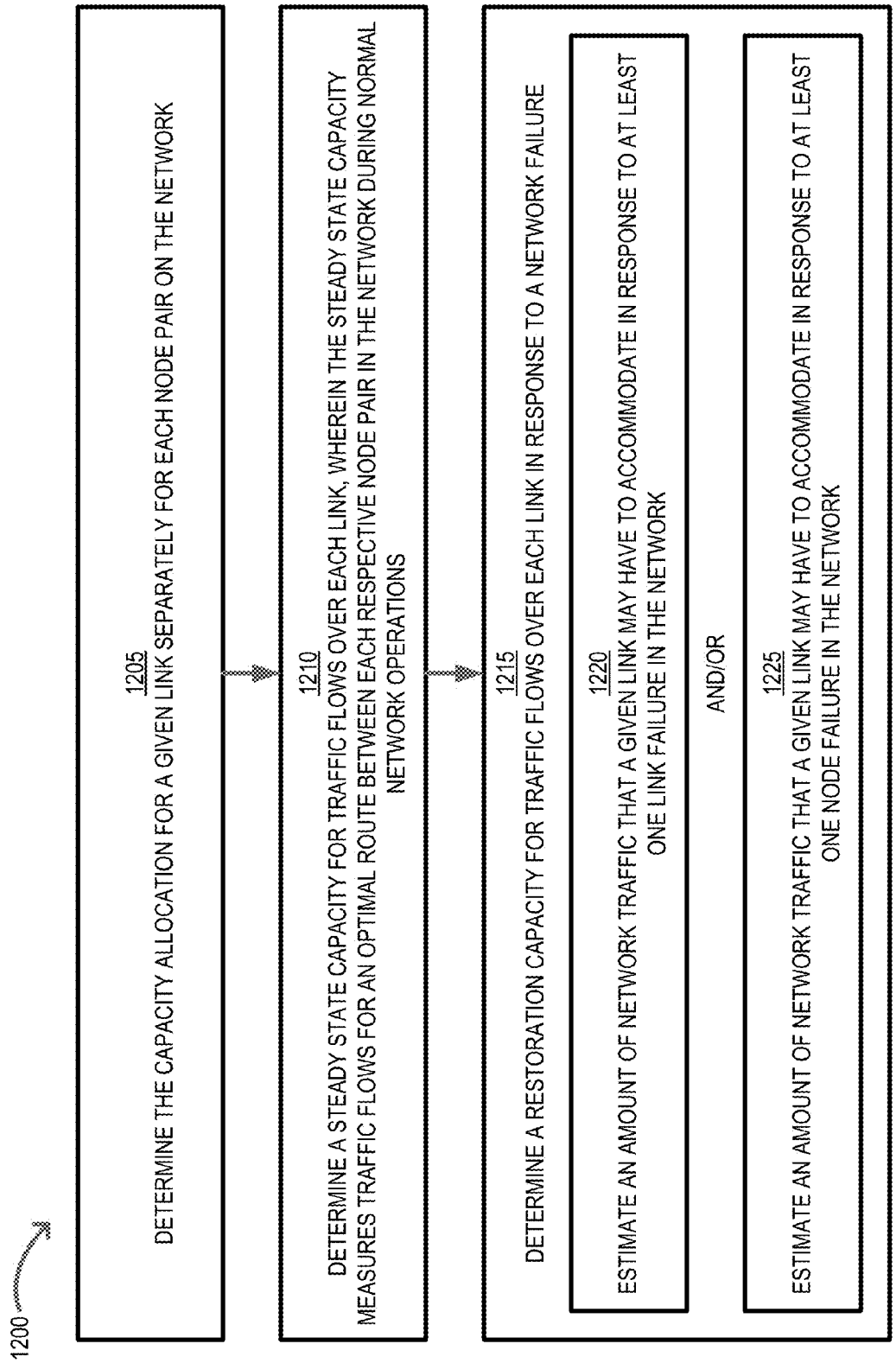
FIG. 12 is a flow chart that shows processing operations performed by a network correlator in accordance with an example embodiment.

FIG. 12 is a flow chart 1200 of processing steps that shows processing operations performed by the cost analyzer 705 in accordance with one example embodiment.

In step 1205, the cost analyzer 705 determines the capacity allocation of each link separately for each node pair on the network. Note that node pairs can be logically coupled and do not necessarily have to be connected by a single physical link.

In step 1210, the cost analyzer 705 determines the steady state capacity for traffic flows over each link (per node pair). According to an example embodiment, the steady state capacity measures traffic flows for an optimal route between each respective node pair in the network during normal network operations (e.g., as determined by a network optimization algorithm).

In step 1215, the cost analyzer 705 determines a restoration (backup) capacity for traffic flows over each link in response to a network failure (i.e., per failure scenario).

In step 1220, the cost analyzer 705 estimates an amount of network traffic that a given link may have to accommodate in response to at least one link failure in the network.

In step 1225, the cost analyzer 705 estimates an amount of network traffic that a given link may have to accommodate in response to at least one node failure in the network.

Figure 13:
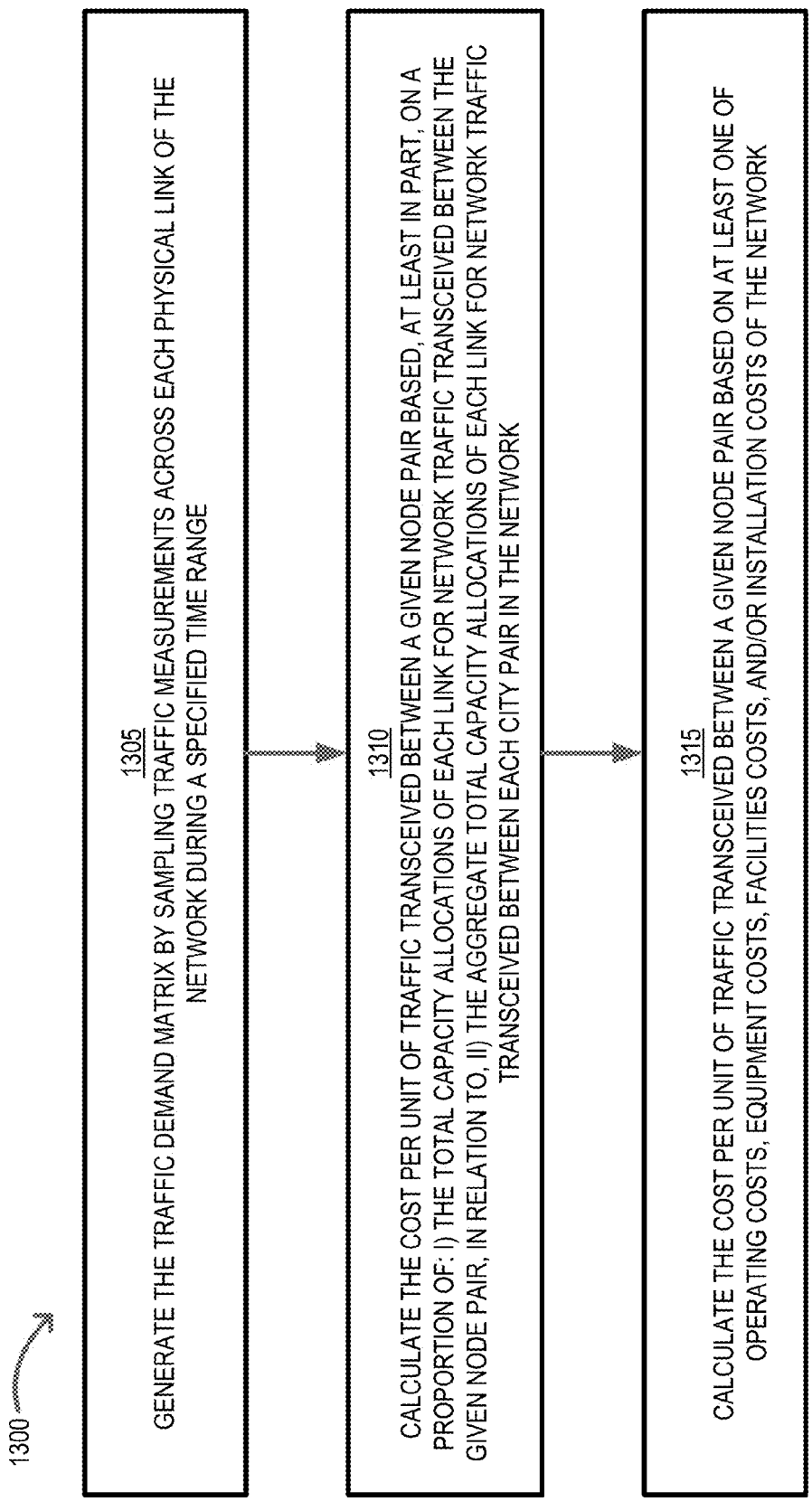
FIG. 13 is a flow chart that shows processing operations performed by a network correlator in accordance with an example embodiment.

FIG. 13 is a flow chart 1300 of processing steps that shows processing operations performed by the cost analyzer 705 in accordance with one example embodiment.

In step 1305, the cost analyzer 705 generates the traffic demand matrix by sampling traffic measurements across each physical link of the network during a specified time range. Alternatively, the cost analyzer 705 is provided with such traffic data and statistics from relational network mapping 710 as previously discussed.

In step 1310, the cost analyzer 705 calculates the cost per unit of traffic transceived between a given node pair based, at least in part, on a proportion of: i) the total capacity allocations of each link for network traffic transceived between the given node pair, in relation to, ii) the aggregate total capacity allocations of each link for network traffic transceived between each city pair in the network. Per an example embodiment, the cost analyzer 705 determines the capacity allocation by calculating, for each link, the steady state and restoration capacities attributable to traffic flows associated with each of a plurality of city pair nodes in the network.

In step 1515, the cost analyzer 705 calculates the cost per unit of traffic transceived between a given node pair based, at least in part, on one of operating costs, equipment costs, facilities costs, and installation costs of the network.

According to one example embodiment, the cost analyzer 705 renders the cost per unit of traffic in a graphical user interface.

Although the present invention has been described with reference to various embodiments, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A computer-implemented method, executable by at least one processor, for calculating incremental network costs between logical city pairs in a network, wherein each city pair is in communication across the network via one or more physical links, the method comprising:

providing the network comprising a plurality of nodes, wherein the plurality of nodes comprises at least one of a router or a switch;

by the at least one processor:

determining, for each physical link in the network, a steady state capacity allocation associated with each city pair in the network, the steady state capacity allocation indicative of a relative proportion of a total steady state traffic flow of the network that the link has for the city pair, the total steady state traffic flow unequally distributed between the one or more physical links;

determining, for each physical link in the network, a restoration capacity allocation associated with each city pair in the network, the restoration capacity allocation indicative of a relative proportion of a total restoration traffic flow of the network that the link has for the pair; and calculating an incremental cost per unit of traffic for a given city pair based on: i) the steady state capacity allocation and a restoration capacity allocation associated with a given city pair, as compared to, ii) the aggregate steady state capacity allocations and restoration capacity allocations associated with each city pair in the network;

wherein the step of calculating the incremental cost per unit of traffic for the given city pair is further based on a traffic demand matrix representative of sampled traffic measurements taken across each physical link of the network during a specified time range, and wherein the sampled traffic measurements are collected via Simple Network Management Protocol (SNMP) messages from at least some of the plurality of nodes.

2. The computer-implemented method as recited in claim 1, wherein the step of determining a steady state capacity allocation for a given physical link comprises estimating an amount of traffic that the given physical link should be able to accommodate during normal network operating conditions.

3. The computer-implemented method as recited in claim 1, wherein the step of determining a restoration capacity allocation for a given physical link comprises estimating an amount of traffic that the given physical link may have to accommodate in response to a failure of at least one other physical link in the network.

4. The computer-implemented method as recited in claim 1, wherein the steady state capacity allocations and the restoration capacity allocations are determined, at least in part, by a network capacity planning algorithm.

5. A system operable to calculate incremental network costs for a traffic flow unequally distributed between logical city pairs in a network, wherein each city pair is in communication across the network via one or more physical links, the system comprising:

the network comprising a plurality of nodes, wherein the plurality of nodes comprises at least one of a router or a switch;

at least one processor;

a steady state capacity allocation module, stored in memory and executable by the at least one processor, operable to determine, for each physical link in the network, a steady state capacity allocation associated with each city pair in the network, wherein the steady state capacity allocation is indicative of a relative proportion of a total steady state traffic flow of the network that the link has for the city pair, the total steady state traffic flow unequally distributed between the one or more physical links;

a restoration capacity allocation module, stored in memory and executable by the at least one processor, operable to determine, for each physical link in the network, a restoration capacity allocation associated with each city pair in the network, wherein the restoration capacity is indicative of a relative proportion of a total restoration traffic flow of the network that the link has for the city pair; and a cost allocation module, stored in memory and executable by the at least one processor, operable to calculate an incremental cost per unit of traffic for the unequally distributed traffic flow to provide a location-specific cost analysis, the incremental cost per unit of traffic for a given city pair based on: i) the steady state capacity allocation and a restoration capacity allocation associated with a given city pair, as compared to, ii) the aggregate steady state capacity allocations and restoration capacity allocations associated with each city pair in the network;

wherein the cost allocation module is operable to calculate an incremental cost per unit of traffic for a given city pair based on a traffic demand matrix representative of sampled traffic measurements taken across each physical link of the network during a specified time range, and wherein the sampled traffic measurements are collected via Simple Network Management Protocol (SNMP) messages from at least some of the plurality of nodes.

6. The system as recited in claim 5, wherein the steady state capacity allocation module is further operable to estimate an amount of traffic that the given physical link should be able to accommodate during normal network operating conditions.

7. The system as recited in claim 5, wherein the restoration capacity allocation module is further operable to estimate an amount of traffic that the given physical link may have to accommodate in response to a failure of at least one other physical link in the network.

8. The system as recited in claim 5, wherein the steady state capacity allocations and the restoration capacity allocations are determined, at least in part, by a network capacity planning algorithm.

9. A non-transitory computer-readable medium with computer-executable instructions stored thereon, the computer-executable instructions, when executed by a processing device, enabling the processing device to calculate incremental network costs between logical city pairs in a network, wherein each city pair is in communication across the network via one or more physical links, the computer-executable instructions comprising:

enabling communications with a plurality of nodes of the network, wherein the plurality of nodes comprises at least one of a router or a switch, and wherein the communications comprise at least Simple Network Management Protocol (SNMP) messages;

determining, for each physical link in the network, a steady state capacity allocation associated with each city pair in the network, the steady state capacity allocation indicative of a relative proportion of a total steady state traffic flow of the network that the link has for the city pair, the total steady state traffic flow unequally distributed between the one or more physical links;

determining, for each physical link in the network, a restoration capacity allocation associated with each city pair in the network, the restoration capacity allocation indicative of a relative proportion of a total restoration traffic flow of the network that the link has for the city pair; and calculating an incremental cost per unit of traffic for a given city pair based on: i) the steady state capacity allocation and a restoration capacity allocation associated with a given city pair, as compared to, ii) the aggregate steady state capacity allocations and restoration capacity allocations associated with each city pair in the network;

wherein the step of calculating the incremental cost per unit of traffic for the given city pair is further based on a traffic demand matrix representative of sampled traffic measurements taken across each physical link of the network during a specified time range, and wherein the sampled traffic measurements are collected via the SNMP messages from at least some of the plurality of nodes.

10. The non-transitory computer-readable medium as recited in claim 9, wherein the step of determining a steady state capacity allocation for a given physical link comprises estimating an amount of traffic that the given physical link should be able to accommodate during normal network operating conditions.

11. The non-transitory computer-readable medium as recited in claim 9, wherein the step of determining a restoration capacity allocation for a given physical link comprises estimating an amount of traffic that the given physical link may have to accommodate in response to a failure of at least one other physical link in the network.

12. The non-transitory computer-readable medium as recited in claim 9, wherein the steady state capacity allocations and the restoration capacity allocations are determined, at least in part, by a network capacity planning algorithm.

* * * * *